(12) United States Patent
Jiang et al.

(10) Patent No.: US 9,971,115 B2
(45) Date of Patent: *May 15, 2018

(54) DATA COMMUNICATIONS CABLE FOR COMMUNICATING DATA AND POWER VIA OPTICAL AND ELECTRICAL SIGNALS

(71) Applicant: Cosemi Technologies, Inc., Irvine, CA (US)

(72) Inventors: Wenbin Jiang, Irvine, CA (US); Chien-Yu Kuo, Irvine, CA (US); Nguyen X. Nguyen, Irvine, CA (US)

(73) Assignee: cosemi technologies, inc., Irvine, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/186,678

(22) Filed: Jun. 20, 2016

(65) Prior Publication Data
US 2016/0306127 A1    Oct. 20, 2016

Related U.S. Application Data

(60) Continuation of application No. 14/581,667, filed on Dec. 23, 2014, now abandoned, which is a division of
(Continued)

(51) Int. Cl.
*G02B 6/44* (2006.01)
*H04B 10/25* (2013.01)
(Continued)

(52) U.S. Cl.
CPC ......... *G02B 6/4416* (2013.01); *G02B 6/4279* (2013.01); *G02B 6/4284* (2013.01);
(Continued)

(58) Field of Classification Search
None
See application file for complete search history.

(56) References Cited

U.S. PATENT DOCUMENTS 5,966,387 A    10/1999   Cloutier
7,551,852 B2    6/2009   Reintjes et al.
(Continued)

FOREIGN PATENT DOCUMENTS

EP    1978656      10/2008
JP    2009055306   12/2009
(Continued)

OTHER PUBLICATIONS

PCT/US12/57520. Int'l Search Report & Written Opinion (dated Feb. 1, 2013).
(Continued)

*Primary Examiner* — Michelle R Connelly
(74) *Attorney, Agent, or Firm* — Loza & Loza, LLP; George Fountain

(57) ABSTRACT

A data communication system is disclosed including a cable medium and modulator adapted to carry data and power between a high speed data source and a high speed data sink. Relatively high speed data (e.g. the TMDS data of an HDMI interface) may be carried on optical waveguides in the cable medium. Relatively low-speed data (e.g., DDC data and clock, and CEC of an HDMI interface) may be carried on a separate set of optical waveguides or wire mediums. The optical waveguides allow for substantially less signal distortion of the high-speed data, thereby allowing the cable medium to achieve much higher lengths without significantly affecting the high-speed signaling.

20 Claims, 21 Drawing Sheets

Related U.S. Application Data application No. 13/627,911, filed on Sep. 26, 2012, now Pat. No. 8,948,197.

(60) Provisional application No. 61/540,461, filed on Sep. 28, 2011, provisional application No. 61/543,695, filed on Oct. 5, 2011, provisional application No. 61/543,668, filed on Oct. 5, 2011, provisional application No. 61/543,738, filed on Oct. 5, 2011, provisional application No. 61/543,722, filed on Oct. 5, 2011.

(51) Int. Cl.
    *G02B 6/42* (2006.01)
    *H04B 10/40* (2013.01)
    *H04B 10/516* (2013.01)

(52) U.S. Cl.
    CPC ............ *G02B 6/4293* (2013.01); *H04B 10/25* (2013.01); *H04B 10/40* (2013.01); *H04B 10/516* (2013.01)

(56) References Cited

U.S. PATENT DOCUMENTS

| | | | |
|---|---|---|---|
| 7,602,739 | B2 | 10/2009 | Weigert |
| 7,941,052 | B2 | 5/2011 | Epitaux et al. |
| 8,068,742 | B2 | 11/2011 | Cole et al. |
| 8,805,195 | B2 | 8/2014 | Mateosky et al. |
| 8,824,898 | B2 | 9/2014 | Groepl et al. |
| 8,831,436 | B2 | 9/2014 | Evans et al. |
| 8,935,740 | B2 | 1/2015 | Suzuki et al. |
| 8,948,197 | B2 * | 2/2015 | Jiang .................... G02B 6/4274 330/59 |
| 2002/0126967 | A1 | 9/2002 | Panak et al. |
| 2003/0132941 | A1 | 7/2003 | Echizenya |
| 2004/0056732 | A1 | 3/2004 | Errington |
| 2004/0184746 | A1 | 9/2004 | Chang et al. |
| 2006/0024067 | A1 | 2/2006 | Koontz |
| 2006/0221948 | A1 | 10/2006 | Benner et al. |
| 2007/0014522 | A1 | 1/2007 | Yamaguchi et al. |
| 2007/0237463 | A1 | 10/2007 | Aronson |
| 2007/0237470 | A1 | 10/2007 | Aronson et al. |
| 2007/0286600 | A1 | 12/2007 | Guo et al. |
| 2008/0031629 | A1 | 2/2008 | Nguyen et al. |
| 2009/0260043 | A1 | 10/2009 | Tatsuta et al. |
| 2010/0150573 | A1 * | 6/2010 | Furuyama ............ G02B 6/3895 398/142 |
| 2010/0284323 | A1 | 11/2010 | Tang et al. |
| 2011/0091219 | A1 | 4/2011 | Tatum et al. |
| 2011/0111642 | A1 | 5/2011 | Sloey et al. |
| 2012/0249871 | A1 | 10/2012 | Nguyen et al. |
| 2013/0109317 | A1 | 5/2013 | Kikuchi et al. |
| 2013/0147520 | A1 | 6/2013 | Payne |
| 2013/0243437 | A1 * | 9/2013 | Kishima ............... G02B 6/4201 398/116 |
| 2014/0346325 | A1 | 11/2014 | Frank |
| 2015/0110499 | A1 | 4/2015 | Jiang et al. |
| 2015/0295647 | A1 | 10/2015 | Parekh et al. |
| 2017/0054501 | A9 * | 2/2017 | Jiang .................. H04B 10/2504 |

FOREIGN PATENT DOCUMENTS

| | | |
|---|---|---|
| JP | 2011244179 | 12/2011 |
| WO | WO2008119669 | 10/2008 |
| WO | WO2012059071 | 5/2012 |

OTHER PUBLICATIONS

PCT/US12/57520. Int'l Prelim. Report of Patentability (dated Apr. 1, 2014).

PCT/US14/045310. Int'l. Search Report & Written Opinion (dated Nov. 5, 2014).

* cited by examiner

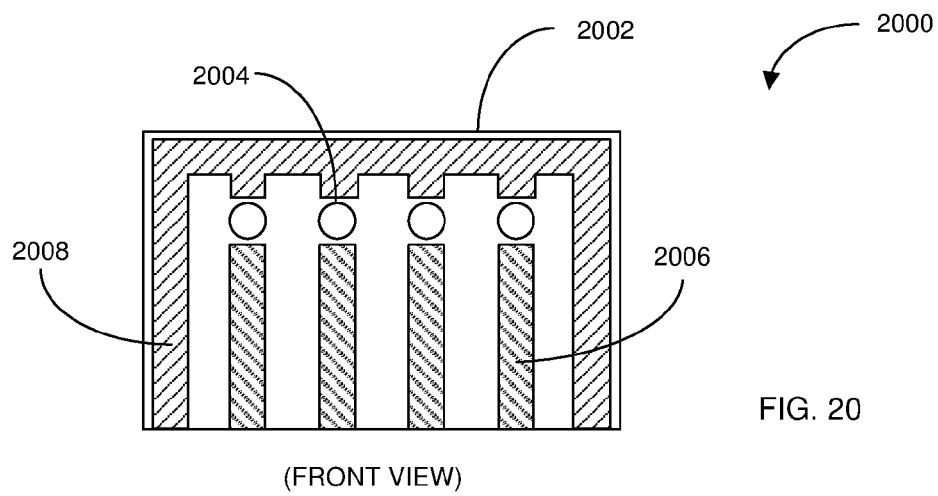
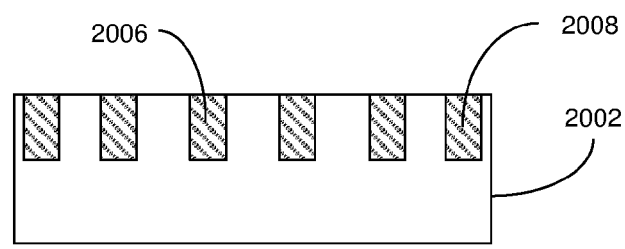
(FRONT VIEW)
(BOTTOM VIEW)
FIG. 20
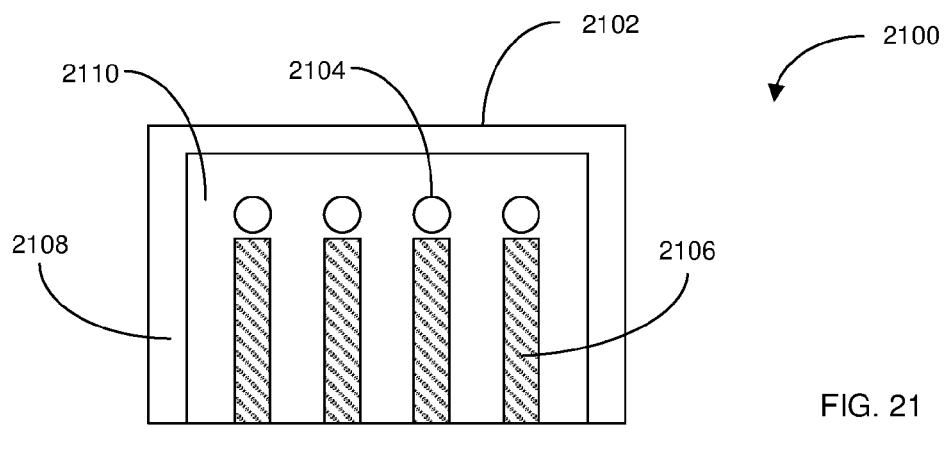
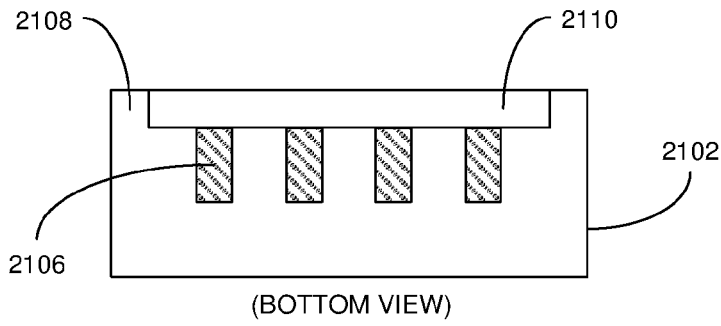
(FRONT VIEW)
(BOTTOM VIEW)
FIG. 21

DATA COMMUNICATIONS CABLE FOR COMMUNICATING DATA AND POWER VIA OPTICAL AND ELECTRICAL SIGNALS

CROSS REFERENCE TO RELATED APPLICATIONS

This application is a continuation of U.S. patent application Ser. No. 14/581,667, filed on Dec. 23, 2014, entitled "Optical Communication Mount for Mounting and Aligning Optical Fibers with Photo Devices," which, in turn, is a divisional of U.S. patent application Ser. No. 13/627,911, filed on Sep. 26, 2012, entitled, "System and Method for Communicating Optical Signals via Communication Cable Medium," now U.S. Pat. No. 8,948,197 B2, which, in turn, claims priority to the filing dates of U.S. Provisional Applications, Ser. Nos.: i) 61/540,461, filed on Sep. 28, 2011; ii) 61/543,695, filed on Oct. 5, 2011; iii) 61/543,668 filed on Oct. 5, 2011; iv) 61/543,738, filed on Oct. 5, 2011; and v) 61/543,722, filed on Oct. 5, 2011, all of which are herein incorporated by reference.

FIELD

This disclosure relates generally to data communication mediums, and in particular, to a system and method for communicating data and power using optical and electrical integrated medium.

BACKGROUND

Consumer multimedia systems of today typically consists of one or more video and audio (V/A) sources communicatively coupled to one or more V/A sinks. Examples of V/A sources include DVD players, Blu-ray players, set-top boxes, camcorders, game consoles, personal computers, and others. Examples of V/A sinks include televisions, personal computers, projectors, audio devices, and others. Typically, standardized interfaces, in the form of cables, are used to communicatively couple V/A sources to V/A sinks.

One such standardized interface is the High-Definition Multimedia Interface, more often referred to simply as HDMI. An HDMI interface generally consists of two identical connectors attached to opposite ends of a cable. The cable typically includes seven (7) twisted pairs of copper wires for communicating various information. Four of the twisted wire pairs are adapted to communicate relatively high-speed data in the form of Transition Minimized Differential Signaling (TMDS). Of the four, three pairs are used for communicating video, audio, and auxiliary data, and are typically referred to as D1-D3. The other pair is used for transmitting a clock associated with the data, and is typically referred to as CLK. The speed of the high-speed data may range from 3 to 10 gigabytes per second (GPS).

The remaining three wire pairs are used for communicating relatively low-speed data, such as in the range of 100 kilobits per second (kbit/s) to 400 kbit/s. Two of such wire pairs are referred to as Display Data Channel (DDC) for providing communication between devices using a communication channel that adheres to an $I^2C$ bus specification. As an example, a V/A source may use the DDC to learn the video/audio format used by a corresponding V/A sink. One of the DDC wire pair, typically referred to as DDC DATA, is used to communicate data between the devices. The other DDC wire pair, typically referred to as DDC CLK, is used to transmit a clock associated with the data.

The remaining twisted wire pair for low-speed data is used for communicating remote control commands between the devices. Such data channel is typically referred to as Consumer Electronics Control (CEC). The CEC channel allows a user to use a single remote to control multiple devices coupled together via HDMI cables. More specifically, a unique address is assigned to the connected group of devices, which is used for sending remote control commands to the devices.

A drawback of the conventional HDMI is that length of the cable is typically limited to a relatively short distance. This is because distortion of the signal propagating through a twisted wire pair is significantly dependent on the length of the cable. At large lengths, the distortion of the signal may be so significant that the signal may not be able to be properly received by a V/A sink.

Optical communication systems use modulated optical electromagnetic energy or light to communicate information from one device to another. In such systems, one or more optical fibers are used to communicatively couple the devices. Further, at the transmission-side of such communication systems, an optical modulator is employed to modulate information in the form of an electrical signal onto optical energy. Typically, one or more vertical-cavity surface-emitting lasers (VCSELs) are used to perform the modulation. Similarly, at the reception-side of such communication systems, an optical demodulator is employed to demodulate information on the optical energy to produce an information-bearing electrical signal. Typically, one or more photo detectors (PDs) are used to perform the demodulation.

A VCSEL of an optical transmitter should be optically aligned with a corresponding optical waveguide or fiber in order for the optical signal to be efficiently coupled to the optical waveguide or optical fiber for transmission. Similarly, a PD of an optical receiver should be optically aligned with a corresponding optical waveguide or optical fiber in order to efficiently receive or detect the optical energy being received via the optical waveguide or optical fiber. Additionally, with regard to both VCSEL and PD, bias voltage needs to be provided to the devices in order for them to function.

Accordingly, there is a need for an HDMI or other data interface that is able to achieve lower signal distortion through the cable, thereby allowing the cable to be longer without significantly affecting the signals. Additionally, there is a need for such an interface to provide power as well. Further, there is a need to provide an indication power is available from either a V/A source or a V/A sink.

There is also a need for a mechanical assembly or mount to provide effective alignment of a VCSEL or PD with a corresponding optical waveguide or optical fiber, while at the same time, effectuating the necessary electrical routing for providing a bias voltage to such device.

SUMMARY

An aspect of the disclosure relates to a data communication cable medium, comprising a cable with optical waveguides for carrying relatively high-speed data from a high speed data source (e.g. DVD players, Blu-ray players, set-top boxes, camcorders, game consoles, personal computers, and others) to a high speed data sink (e.g. televisions, personal computers, projectors, audio devices etc). The cable medium may further include optical modulator and demodulator in order to convert the high-speed data from an electrical domain to an optical domain, and vice-versa.

In another aspect of the disclosure, the cable medium comprises one or more optical waveguides to carry the relatively high speed data and one or more wire mediums to carry relatively low speed data. An example of relatively high speed data is the TMDS data of an HDMI interface. An example of relatively low speed data is the DDC data and clock, and CEC of an HDMI interface. The cable medium may include a pair of multiplexer/demultiplexer at respective ends of the cable to multiplex and demultiplex two or more of the relatively low-speed data types to and from one or more wire mediums.

In another aspect of the disclosure, the cable medium comprises one or more optical waveguides to carry the relatively high speed data and one or more wire mediums to carry relatively low speed data and power signals. The cable medium may include a pair of multiplexer/demultiplexer at respective ends of the cable to multiplex and demultiplex two or more of the relatively low-speed data types to and from one or more wire mediums. The cable medium may include another pair of multiplexer/demultiplexer at respective ends of the cable to multiplex and demultiplex a relatively low-speed data type with a power signal to and from one or more wire mediums. The cable medium may further comprise one or more detectors to generate an indication as to the presence of the power signal, and may comprise one or more ports (e.g., USB port) configured to receive or produce the power signals (e.g., +5V and GND).

In another aspect of the disclosure the cable medium comprises one or more optical waveguides for carrying the relatively high speed data and one or more separate optical fibers for carrying relatively low speed data. Arbiters at both ends of the cable may prevent collision of the low-speed data, as the low speed data may be sent bi-directionally.

In another aspect of the disclosure, an optical communication mount is provided which facilitates the surface mounting of optical transmitters, receivers or transceivers. The optical communication mount comprises a housing including one or more thru-holes extending from a first side of the housing to a second side of the housing, a first set of one or more electrically-conductive traces disposed on a bottom side of the housing, and a second set of one or more electrically-conductive traces disposed on the front side of the housing. The optical communication mount further comprises one or more optical fibers extending into the one or more thru-holes from the second side of the housing. Additionally, the optical communication mount further comprises one or more photo devices substantially registered with the one or more thru-holes at the front side of the housing in a manner to receive and/or transmit one or more optical signals by way of the one or more optical fibers, and wherein the one or more photo devices are configured to receive one or more bias voltages by way of the second set of one or more electrically-conductive traces, respectively.

Other aspects, advantages and novel features of the present disclosure will become apparent from the following detailed description when considered in conjunction with the accompanying drawings.

BRIEF DESCRIPTION OF THE DRAWINGS

FIG. 20 illustrates front and bottom views of still another exemplary optical communication mount in accordance with another aspect of the disclosure.

FIG. 21 illustrates front and bottom views of an additional exemplary optical communication mount in accordance with another aspect of the disclosure.

DETAILED DESCRIPTION OF THE EXEMPLARY EMBODIMENTS

Hybrid Data Communication Cable Medium

Figure 1:
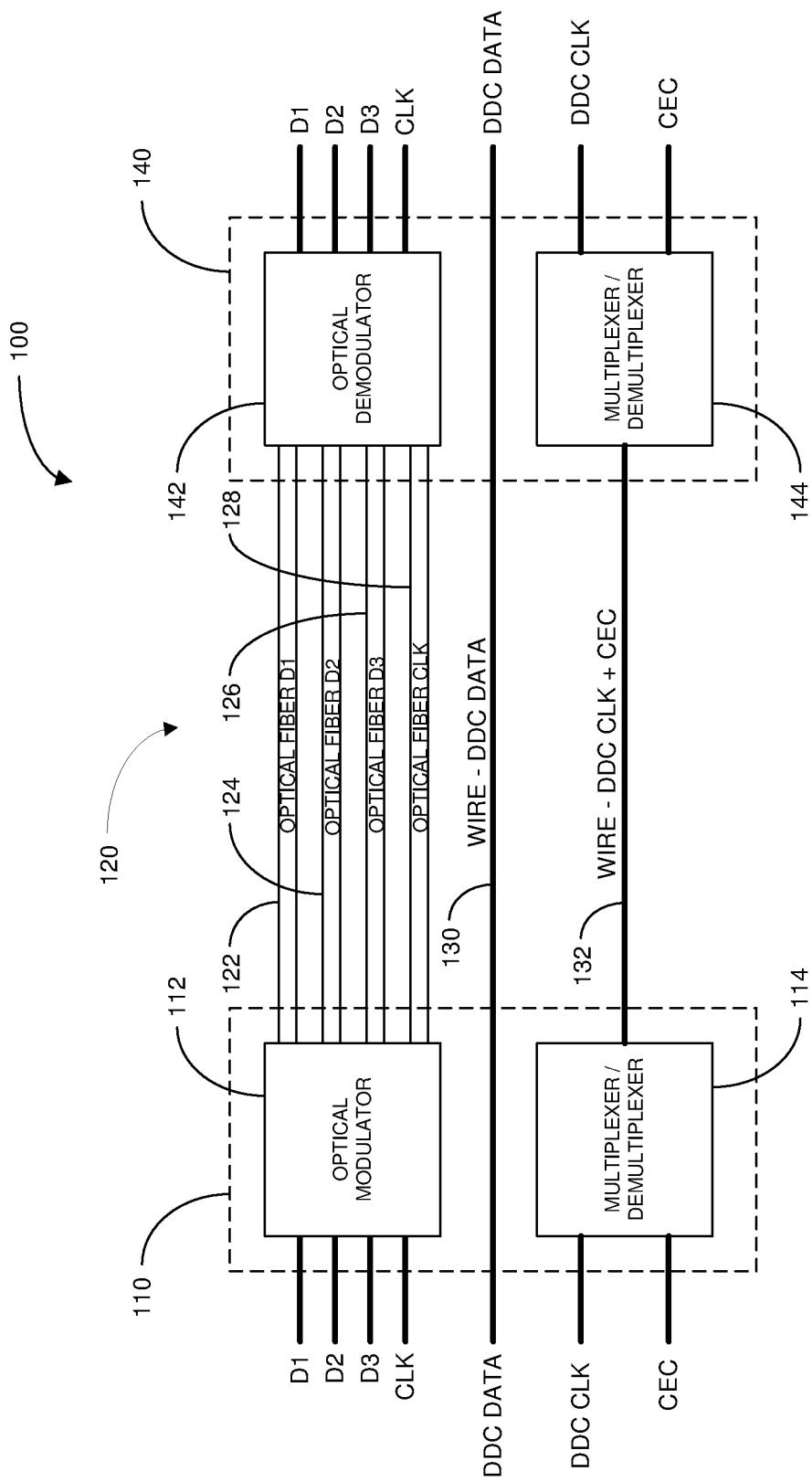
FIG. 1 illustrates a schematic/block diagram of an exemplary data communication cable medium in accordance with an aspect of the disclosure.

FIG. 1 illustrates a schematic/block diagram of an exemplary data communication cable medium 100 in accordance with an aspect of the disclosure. In summary, the data communication cable medium 100 comprises a plurality of optical waveguides (e.g., optical fibers) through which relatively high-speed data (e.g., the TMDS data of an HDMI interface) are communicated, and a plurality of electrical wires through which relatively low-speed data (e.g., DDC data and clock, and CEC of an HDMI interface) are communicated. The optical waveguides result in substantially less signal distortion of the high-speed data, thereby allowing the cable medium 100 to achieve much higher lengths without significantly affecting the high-speed signaling.

More specifically, with reference to FIG. 1, the data communication cable medium 100 comprises a cable 120, a first connector 110 coupled to an end of the cable 120, and a second connector 140 coupled to an opposite end of the cable 120. The cable 120 comprises a plurality of optical waveguides (e.g., optical fibers) 122, 124, 126 and 128 for communicating relatively high-speed data from the first connector 110 to the second connector 140. Additionally, the cable 120 comprises a plurality of wire mediums 130 and 132 for communicating relatively low-speed data between the first connector 110 and the second connector 140.

The first connector 110 is adapted to mate with a corresponding connector of a source of relatively high-speed data, such as a DVD player, Blu-Ray player, and others as previously indicated. The first connector 110 comprises a first set of electrical contacts adapted to receive relatively high-speed data, such as the TMDS data (D1-D3 and CLK) of an HDMI interface. The first connector 110 further comprises a second set of electrical contacts adapted to receive and/or produce relatively low-speed data, such as the DDC DATA, DDC CLK, and CEC of an HDMI interface. The first and second sets of electrical contacts of the first connector 110 may be configured substantially the same as a standard HDMI connector.

The first connector 110 further comprises an optical modulator 112 adapted to modulate the high-speed data received via the electrical contacts onto respective optical carriers for transmission via optical waveguides 122, 124, 126, and 128, respectively. For example, with reference to an HDMI interface, the optical modulator is adapted to modulate the TMDS data (e.g., D1-D3 and CLK) onto respective optical carriers for transmission via optical waveguides 122, 124, 126 and 128, respectively.

The first connector 110 also comprises a multiplexer/demultiplexer 114 adapted to multiplex relatively low-speed data (being communicated from the high-speed data source to the high-speed data sink) onto the wire medium 132 of the cable 120. For example, with reference to an HDMI interface, the multiplexer/demultiplexer 114 is adapted to multiplex the DDC CLK and CEC onto the wire medium 132.

Similarly, the multiplexer/demultiplexer 114 is adapted to demultiplex relatively low-speed data (being communicated from the high-speed data sink to the high-speed data source) from the wire medium 132 of the cable 120 to electrical contacts of the first connector 110. For example, with reference to an HDMI interface, the multiplexer/demultiplexer 114 is adapted to demultiplex the DDC CLK and CEC from the wire medium 132 to the corresponding electrical contacts.

Some of the low speed data may be coupled directly via a wire medium from the first connector 110 to the second connector 140 by way of the cable. For instance, the first connector 110 may directly couple the DDC DATA electrical contact to the wire medium 130 of the cable 120. Similarly, the second connector 140 may directly couple the wire medium 130 of the cable 120 to the corresponding DDC DATA electrical contact of the second connector 140.

The second connector 140 is adapted to mate with a corresponding connector of a sink of the relatively high-speed data, such as a television, projector, computer, and others as previously indicated. The second connector 140 comprises a first set of electrical contacts adapted to produce the relatively high-speed data, such as the TMDS data (D1-D3 and CLK) of an HDMI interface. The second connector 140 further comprises a second set of electrical contacts adapted to receive and/or produce the relatively low-speed data, such as the DDC DATA, DDC CLK, and CEC of an HDMI interface. The first and second sets of electrical contacts of the second connector 140 may be configured substantially the same as a standard HDMI connector.

The second connector 140 further comprises an optical demodulator 142 adapted to demodulate the high-speed data on optical carriers received via optical waveguides 122, 124, 126, and 128 to corresponding electrical contacts, respectively. For example, with reference to an HDMI interface, the optical demodulator is adapted to demodulate the TMDS data (e.g., D1-D3 and CLK) from the optical waveguides 122, 124, 126 and 128 to corresponding electrical contacts, respectively.

The second connector 140 also comprises a multiplexer/demultiplexer 144 adapted to multiplex relatively low-speed data (being communicated from the high-speed data sink to the high-speed data source) onto the wire medium 132 of the cable 120. For example, with reference to an HDMI interface, the multiplexer/demultiplexer 144 is adapted to multiplex the DDC CLK and CEC onto the wire medium 132.

Similarly, the multiplexer/demultiplexer 144 is adapted to demultiplex relatively low-speed data (being communicated from the high-speed data source to the high-speed data sink) from the wire medium 132 of the cable 120 to corresponding electrical contacts of the second connector 140. For example, with reference to an HDMI interface, the multiplexer/demultiplexer 144 is adapted to demultiplex the DDC CLK and CEC from the wire medium 132 to the corresponding electrical contacts.

Although an HDMI interface is used to exemplify the configuration of the data communication cable medium 100, it shall be understood that the cable medium 100 may be adapted to transmit high- and low-speed data of other protocols using the combination of optical waveguides and wires. Further, although the optical modulator 112 and multiplexer/demultiplexer 114 have been described as being incorporated into the first connector 110, it shall be understood that these components may be housed separately from the first connector, such as in a separate housing situated between the first connector 110 and the cable 120. Similarly, although the optical demodulator 142 and multiplexer/demultiplexer 144 have been described as being incorporated into the second connector 140, it shall be understood that these components may be housed separately from the second connector, such as in a separate housing situated between the cable 120 and the second connector 140.

Figure 2:
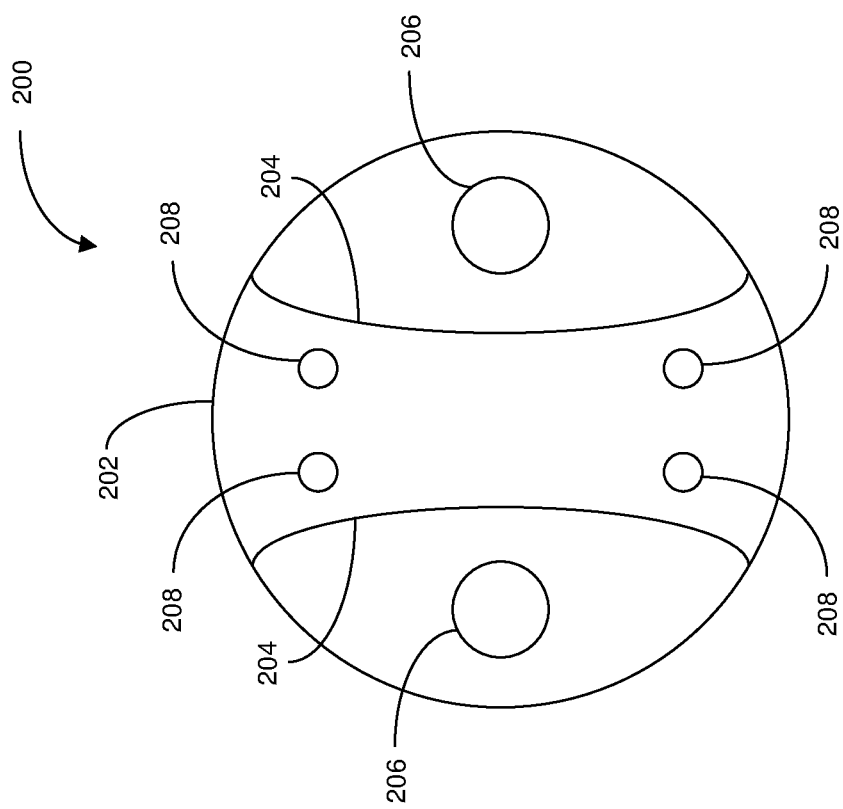
FIG. 2 illustrates a cross-sectional view of an exemplary cable in accordance with another aspect of the disclosure.

FIG. 2 illustrates a cross-sectional view of an exemplary cable 200 in accordance with another aspect of the disclosure. The cable 200 may be one example of an implementation of the cable 120 previously discussed. In particular, the cable 200 comprises a housing or enclosure 202. As typical of cables, the housing or enclosure 202 may be comprised of bendable material to facilitate the routing of the cable 200 along curved paths. The cable 202 includes a couple of internal walls 204 to separate the various physical communication mediums disposed therein.

The cable 202 further comprises a plurality of optical waveguides 208 (e.g., optical fibers) for communicating the relatively high-speed data, as previously discussed. As shown, the optical waveguides 208 are situated within a centrally-located compartment within the cable 200, which is defined by the two internal walls 204 and the housing or enclosure 202. The cable 200 further comprises electrical wires 206 for communicating the relatively low-speed data, as previously discussed. The electrical wires 206 are positioned within their own compartments, both defined by a corresponding the internal wall 204 and the housing or enclosure 202. It shall be understood that the cable 200 may be configured differently to effectuate the routing of the optical waveguides and electrical wires, as previously discussed.

Figure 3:
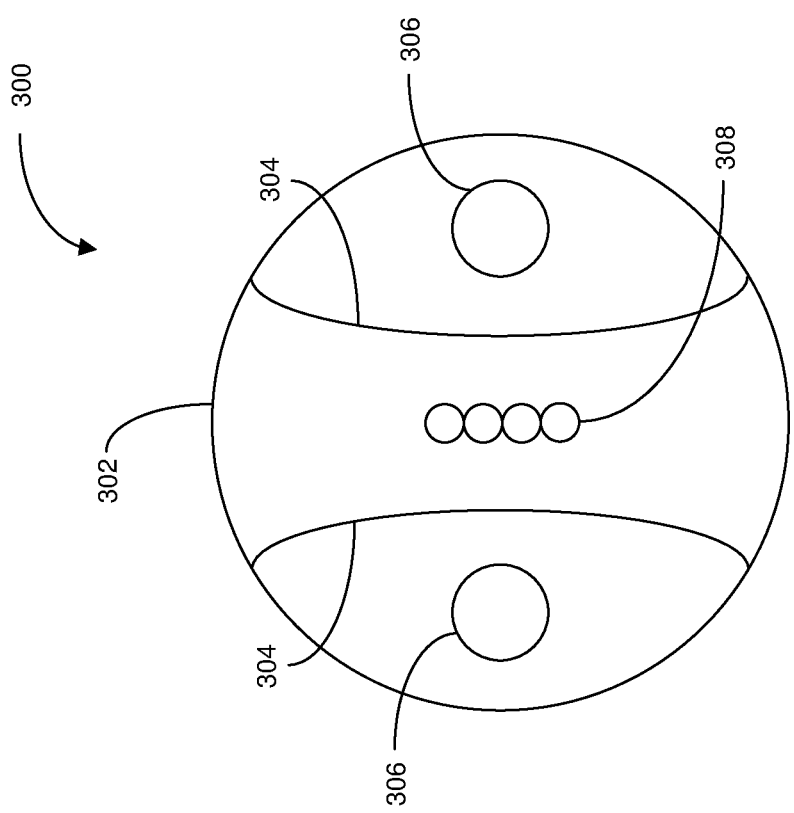
FIG. 3 illustrates a cross-sectional view of another exemplary cable in accordance with another aspect of the disclosure.

FIG. 3 illustrates a cross-sectional view of another exemplary cable 300 in accordance with another aspect of the disclosure. The cable 300 may be another example of an implementation of the cable 120 previously discussed. In particular, the cable 300 comprises a housing or enclosure 302. As typical of cables, the housing or enclosure 302 may be comprised of bendable material to facilitate the routing of the cable 300 along curved paths. The cable 302 includes a couple of internal walls 304 to separate the various physical communication mediums disposed therein.

The cable 302 further comprises a plurality of optical waveguides 308 (e.g., optical fibers) for communicating the relatively high-speed data, as previously discussed. As shown, the optical waveguides 308 may be arranged as a single row array and situated within a centrally-located compartment within the cable 300, which is defined by the two internal walls 304 and the housing or enclosure 302. The cable 300 further comprises electrical wires 306 for communicating the relatively low-speed data, as previously discussed. The electrical wires 306 are positioned within their own compartments, both defined by a corresponding the internal wall 304 and the housing or enclosure 302. It shall be understood that the cable 300 may be configured differently to effectuate the routing of the optical waveguides and electrical wires, as previously discussed.

Hybrid Data and Power Communication Cable Medium

Figure 4:
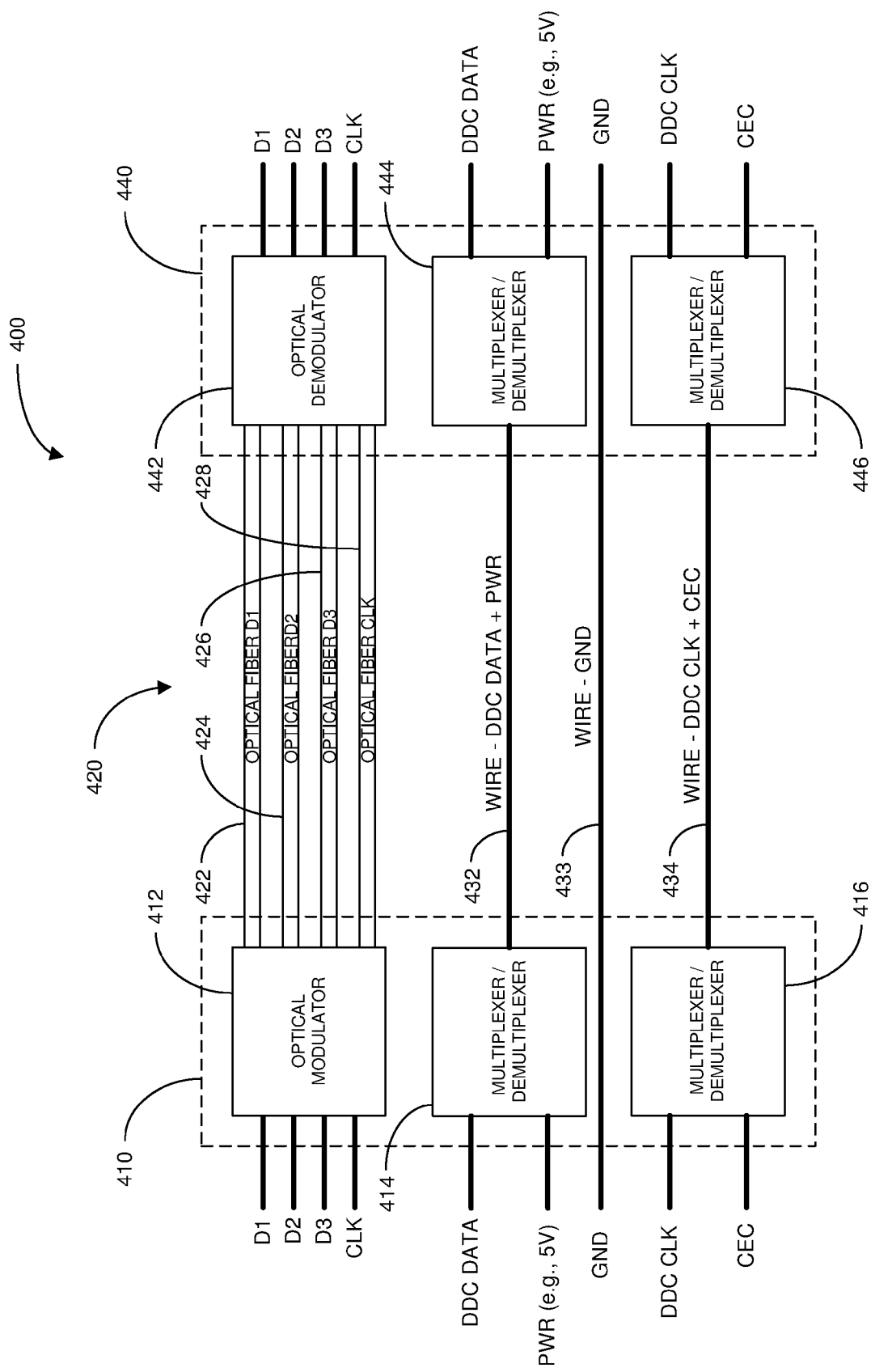
FIG. 4 illustrates a schematic/block diagram of an exemplary data communication cable medium in accordance with an aspect of the disclosure.

FIG. 4 illustrates a schematic/block diagram of an exemplary data communication cable medium 400 in accordance with an aspect of the disclosure. In summary, the data communication cable medium 400 comprises a plurality of optical waveguides (e.g., optical fibers) through which relatively high-speed data (e.g., the TMDS data of an HDMI interface) are communicated, and a plurality of electrical wires through which relatively low-speed data (e.g., DDC data and clock, and CEC of an HDMI interface) and power (e.g., 5 Volts and Ground) are communicated. The optical waveguides result in substantially less signal distortion of the high-speed data, thereby allowing the cable medium 400 to achieve much higher lengths without significantly affecting the high-speed signaling. The transmitted power allows one device to provide power to another device by way of the cable medium 400.

In particular, with reference to FIG. 4, the data communication cable medium 400 comprises a cable 420, a first connector 410 coupled to an end of the cable 420, and a second connector 440 coupled to an opposite end of the cable 420. The cable 420 comprises a plurality of optical waveguides (e.g., optical fibers) 422, 424, 426 and 428 for communicating relatively high-speed data from the first connector 410 to the second connector 440. Additionally, the cable 420 comprises a plurality of wire mediums 432, 433 and 434 for communicating relatively low-speed data and power between the first connector 410 and the second connector 440.

The first connector 410 is adapted to mate with a corresponding connector of a source of relatively high-speed data, such as a DVD player, Blu-ray player, and others as previously indicated. The first connector 410 comprises a first set of electrical contacts adapted to receive relatively high-speed data, such as the TMDS data (D1-D3 and CLK) of an HDMI interface. The first connector 410 further comprises a second set of electrical contacts adapted to receive and/or produce relatively low-speed data, such as the DDC DATA, DDC CLK, and CEC of an HDMI interface. The first and second sets of electrical contacts of the first connector 410 may be configured substantially the same as a standard HDMI connector. Additionally, the first connector 410 comprises a third set of electrical contacts adapted to receive or produce power (e.g., 5 Volts) and ground (GND).

The first connector 410 further comprises an optical modulator 412 adapted to modulate the high-speed data received via the first set of electrical contacts onto respective optical carriers for transmission via optical waveguides 422, 424, 426, and 428, respectively. For example, with reference to an HDMI interface, the optical modulator 412 is adapted to modulate the TMDS data (e.g., D1-D3 and CLK) onto respective optical carriers for transmission via optical waveguides 422, 424, 426 and 428, respectively. The modulating of the data onto respective optical carriers may be accomplished by directly modulating vertical-cavity surface emitting laser (VCSEL) devices.

The first connector 410 further comprises a first multiplexer/demultiplexer 414 adapted to multiplex low-speed data and power (being communicated from the high-speed data source to the high-speed data sink) onto the wire medium 432 for transmission to the second connector 440. For example, with reference to an HDMI interface, the first multiplexer/demultiplexer 414 is adapted to multiplex the DDC DATA and power (e.g., 5 Volts) onto the wire medium 432. Similarly, the first multiplexer/demultiplexer 414 is adapted to demultiplex relatively low-speed data and power (being communicated from the high-speed data sink to the high-speed data source) from the wire medium 432 of the cable 420 to corresponding electrical contacts of the first connector 410. For example, with reference to an HDMI interface, the first multiplexer/demultiplexer 414 is adapted to demultiplex the DDC DATA and power (e.g., 5 Volts) from the wire medium 432 to the corresponding electrical contacts. It shall be understood that the DDC data and power need not be transmitted in the same direction.

The first connector 410 also comprises a second multiplexer/demultiplexer 416 adapted to multiplex other relatively low-speed data (being communicated from the high-speed data source to the high-speed data sink) onto the wire medium 434 of the cable 420. For example, with reference to an HDMI interface, the second multiplexer/demultiplexer 416 is adapted to multiplex the DDC CLK and CEC onto the wire medium 434 for transmission to the second connector 440. Similarly, the second multiplexer/demultiplexer 416 is adapted to demultiplex relatively low-speed data (being communicated from the high-speed data sink to the high-speed data source) from the wire medium 434 of the cable 420 to corresponding electrical contacts of the first connector 410. For example, with reference to an HDMI interface, the second multiplexer/demultiplexer 416 is adapted to demultiplex the DDC CLK and CEC from the wire medium 434 to the corresponding electrical contacts.

The ground potential, associated with the communicated power, may be coupled directly via a wire medium from the first connector 410 to the second connector 440 by way of the cable 420. For instance, the first connector 410 may directly couple the ground electrical contact to the wire medium 433 of the cable 420. Similarly, the second connector 440 may directly couple the wire medium 433 of the cable 420 to the corresponding ground electrical contact.

The second connector 440 is adapted to mate with a corresponding connector of a sink of the relatively high-speed data, such as a television, projector, computer, and others as previously indicated. The second connector 440 comprises a first set of electrical contacts adapted to produce the relatively high-speed data, such as the TMDS data (D1-D3 and CLK) of an HDMI interface. The second connector 440 further comprises a second set of electrical contacts adapted to receive and/or produce the relatively low-speed data, such as the DDC DATA, DDC CLK, and CEC of an HDMI interface. The first and second sets of electrical contacts of the second connector 440 may be configured substantially the same as a standard HDMI connector. Additionally, the second connector 440 comprises a third set of electrical contacts adapted to receive or produce power (e.g., 5 Volts) and ground (GND).

The second connector 440 further comprises an optical demodulator 442 adapted to demodulate the high-speed data on optical carriers received via optical waveguides 422, 424, 426, and 428 to corresponding electrical contacts, respectively. For example, with reference to an HDMI interface, the optical demodulator 442 is adapted to demodulate the TMDS data (e.g., D1-D3 and CLK) from the optical waveguides 422, 424, 426 and 428 to corresponding electrical contacts, respectively. The demodulating of the data from the optical carriers may be accomplished by PIN photodiodes with receiving circuitry (transimpedance amplifier (TIA)).

The second connector 440 further comprises a first multiplexer/demultiplexer 444 adapted to multiplex low-speed data and power (being communicated from the high-speed data sink to the high-speed data source) onto the wire medium 432 for transmission to the first connector 410. For example, with reference to an HDMI interface, the first multiplexer/demultiplexer 444 is adapted to multiplex the DDC DATA and power (e.g., 5 Volts) onto the wire medium 432. Similarly, the first multiplexer/demultiplexer 444 is adapted to demultiplex relatively low-speed data and power (being communicated from the high-speed data source to the high-speed data sink) from the wire medium 432 of the cable 420 to corresponding electrical contacts of the second connector 440. For example, with reference to an HDMI interface, the first multiplexer/demultiplexer 444 is adapted to demultiplex the DDC DATA and power (e.g., 5 Volts) from the wire medium 432 to the corresponding electrical contacts. As discussed above, it shall be understood that the DDC data and power need not be transmitted in the same direction.

The second connector 440 also comprises a second multiplexer/demultiplexer 446 adapted to multiplex relatively low-speed data (being communicated from the high-speed data sink to the high-speed data source) onto the wire medium 434 of the cable 420. For example, with reference to an HDMI interface, the second multiplexer/demultiplexer 446 is adapted to multiplex the DDC CLK and CEC onto the wire medium 434. Similarly, the second multiplexer/demultiplexer 446 is adapted to demultiplex relatively low-speed data (being communicated from the high-speed data source to the high-speed data sink) from the wire medium 434 of the cable 420 to corresponding electrical contacts of the second connector 440. For example, with reference to an HDMI interface, the second multiplexer/demultiplexer 446 is adapted to demultiplex the DDC CLK and CEC from the wire medium 434 to the corresponding electrical contacts.

Although an HDMI interface is used to exemplify the configuration of the data communication cable medium 400, it shall be understood that the cable medium 400 may be adapted to transmit high- and low-speed data and power using the combination of optical waveguides and wires. Further, although the optical modulator 412 and first and second multiplexer/demultiplexer 414 and 416 have been described as being incorporated into the first connector 410, it shall be understood that these components may be housed separately from the first connector, such as in a separate housing situated between the first connector 410 and the cable 420. Similarly, although the optical demodulator 442 and first and second multiplexer/demultiplexer 444 and 446 have been described as being incorporated into the second connector 440, it shall be understood that these components may be housed separately from the second connector, such as in a separate housing situated between the cable 420 and the second connector 440.

Figure 5:
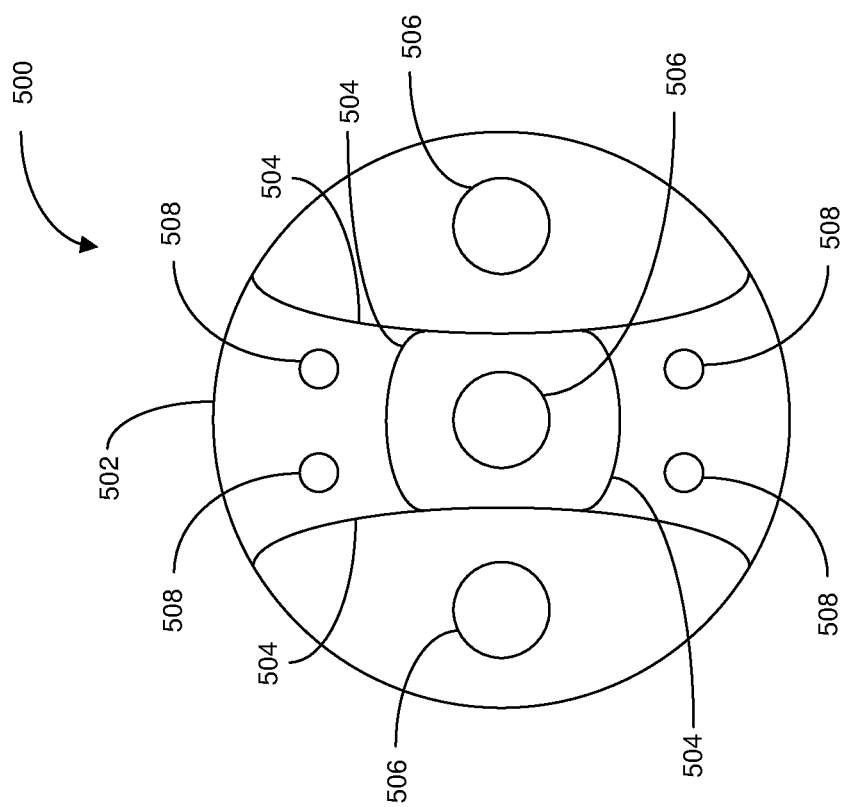
FIG. 5 illustrates a cross-sectional view of an exemplary cable in accordance with another aspect of the disclosure.

FIG. 5 illustrates a cross-sectional view of an exemplary cable 500 in accordance with another aspect of the disclosure. The cable 500 may be one example of an implementation of the cable 420 previously discussed. In particular, the cable 500 comprises a housing or enclosure 502. As typical of cables, the housing or enclosure 502 may be comprised of bendable material to facilitate the routing of the cable 500 along curved paths. The cable 502 includes internal walls 504 to separate the various physical communication mediums disposed therein.

The cable 500 further comprises a plurality of optical waveguides 508 (e.g., optical fibers) for communicating the relatively high-speed data, as previously discussed. As shown, the optical waveguides 508 are situated within upper and lower centrally-located compartments within the cable 500, which are defined by the two internal walls 504 and the housing or enclosure 502. The cable 500 further comprises electrical wires 506 for communicating the relatively low-speed data, power and ground, as previously discussed. The electrical wires 506 are positioned within their own compartments, two of which are defined by a corresponding internal wall 504 and the housing or enclosure 502, and the other is centrally-located within the housing 502, being defined exclusively by the internal walls 504. It shall be understood that the cable 500 may be configured differently to effectuate the routing of the optical waveguides and electrical wires, as previously discussed.

Figure 6:
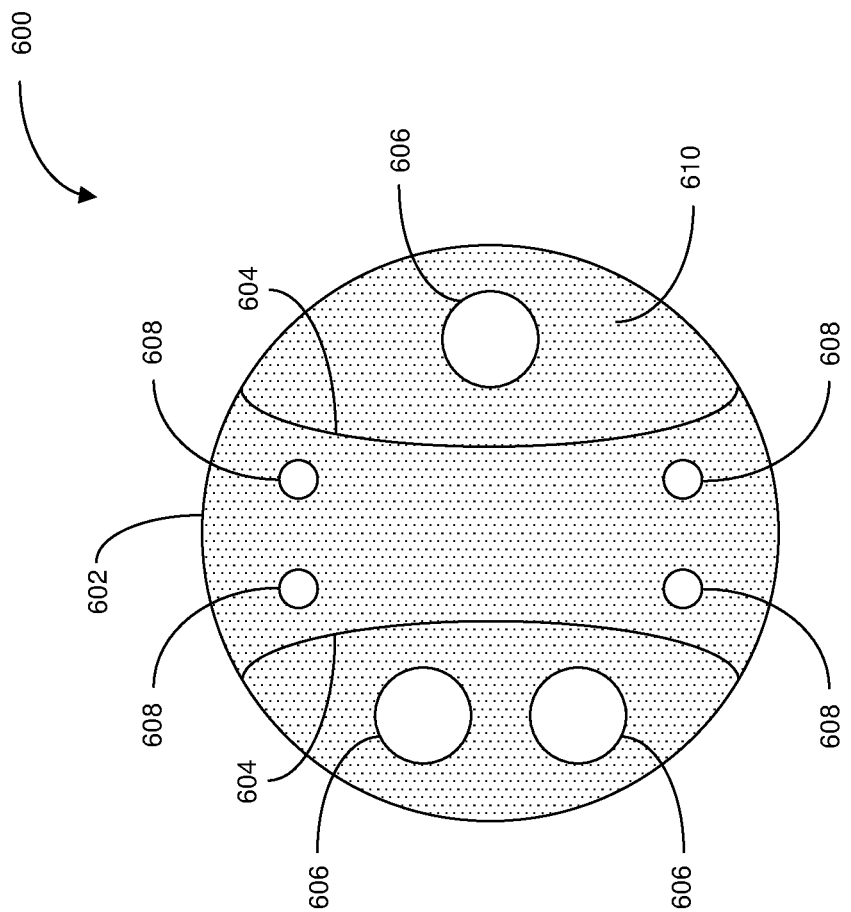
FIG. 6 illustrates a cross-sectional view of another exemplary cable in accordance with another aspect of the disclosure.

FIG. 6 illustrates a cross-sectional view of another exemplary cable 600 in accordance with another aspect of the disclosure. The cable 600 may be another example of an implementation of the cable 420 previously discussed. In particular, the cable 600 comprises a housing or enclosure 602. As typical of cables, the housing or enclosure 602 may be comprised of bendable material to facilitate the routing of the cable 600 along curved paths. The cable 602 includes internal walls 304 to separate the various physical communication mediums disposed therein.

The cable 600 further comprises a plurality of optical waveguides 608 (e.g., optical fibers) for communicating the relatively high-speed data, as previously discussed. As shown, the optical waveguides 608 are situated within a centrally-located compartment within the cable 600, which is defined by two internal walls 604 and the housing or enclosure 602. The cable 600 further comprises electrical wires 606 for communicating the relatively low-speed data, power and ground, as previously discussed. A pair of the electrical wires 606 may be positioned within a leftward-located compartment defined by the left internal wall 604 and the housing or enclosure 602. The other electrical wire 606 may be positioned within a rightward-located compartment defined by the right internal wall 604 and the housing or enclosure 602. Filler material 610 may be provided within the cable 600 to provide mechanical stability of the communication mediums 606 and 608. It shall be understood that the cable 600 may be configured differently to effectuate the routing of the optical waveguides and electrical wires, as previously discussed.

Figure 7:
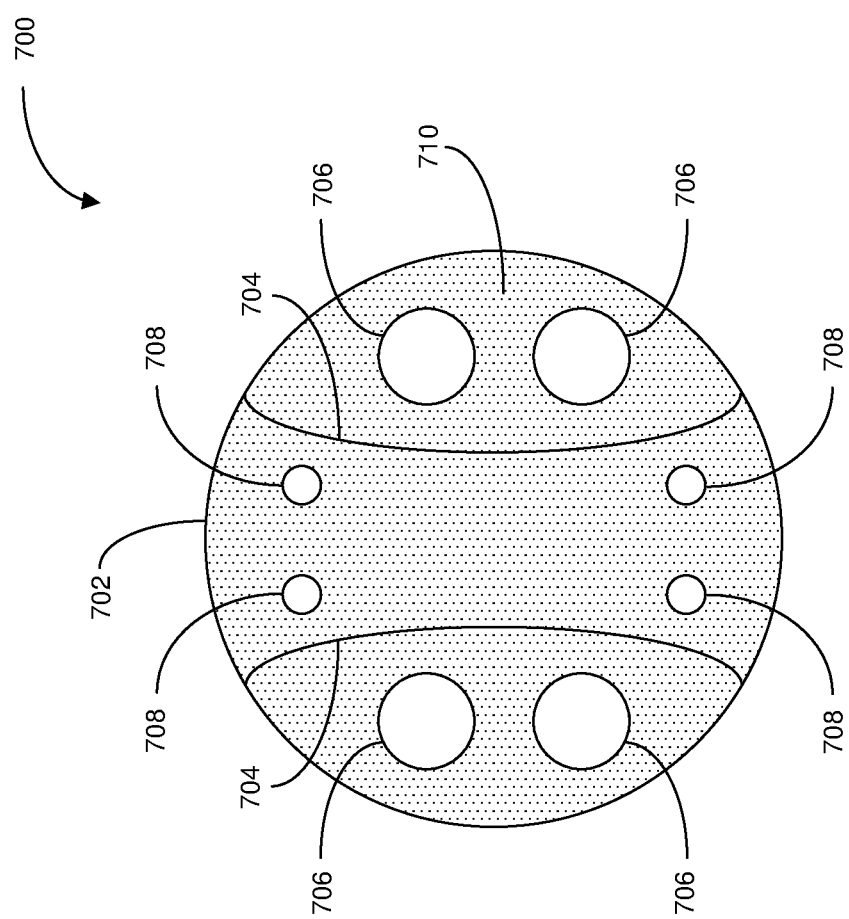
FIG. 7 illustrates a cross-sectional view of yet another exemplary cable in accordance with another aspect of the disclosure.

FIG. 7 illustrates a cross-sectional view of yet another exemplary cable 700 in accordance with another aspect of the disclosure. The cable 700 may be another example of an implementation of a modified version of the cable 420 previously discussed. In particular, the cable 700 comprises a housing or enclosure 702. As typical of cables, the housing or enclosure 702 may be comprised of bendable material to facilitate the routing of the cable 700 along curved paths. The cable 702 includes internal walls 704 to separate the various physical communication mediums disposed therein.

The cable 700 further comprises a plurality of optical waveguides 708 (e.g., optical fibers) for communicating the relatively high-speed data, as previously discussed. As shown, the optical waveguides 708 are situated within a centrally-located compartment within the cable 700, which is defined by two internal walls 704 and the housing or enclosure 702. The cable 700 further comprises electrical wires 706 for communicating the relatively low-speed data, power and ground, as previously discussed. A pair of the electrical wires 706, for communicating the DDC DATA/ power and ground, may be positioned within a leftward-located compartment defined by the left internal wall 704 and the housing or enclosure 702.

The other pair of the electrical wires 706, for communicating the DDC CLK and CEC, may be positioned within a rightward-located compartment defined by the left internal wall 704 and the housing or enclosure 702. Note that this embodiment may not require the multiplexer/demultiplexer 416 and 446, since these two types of information is being communicated with respective wire mediums. Filler material 710 may be provided within the cable 700 to provide mechanical stability of the communication mediums 706 and 708. It shall be understood that the cable 700 may be configured differently to effectuate the routing of the optical waveguides and electrical wires, as previously discussed.

Optical Data Communication Cable Medium

Figure 8:
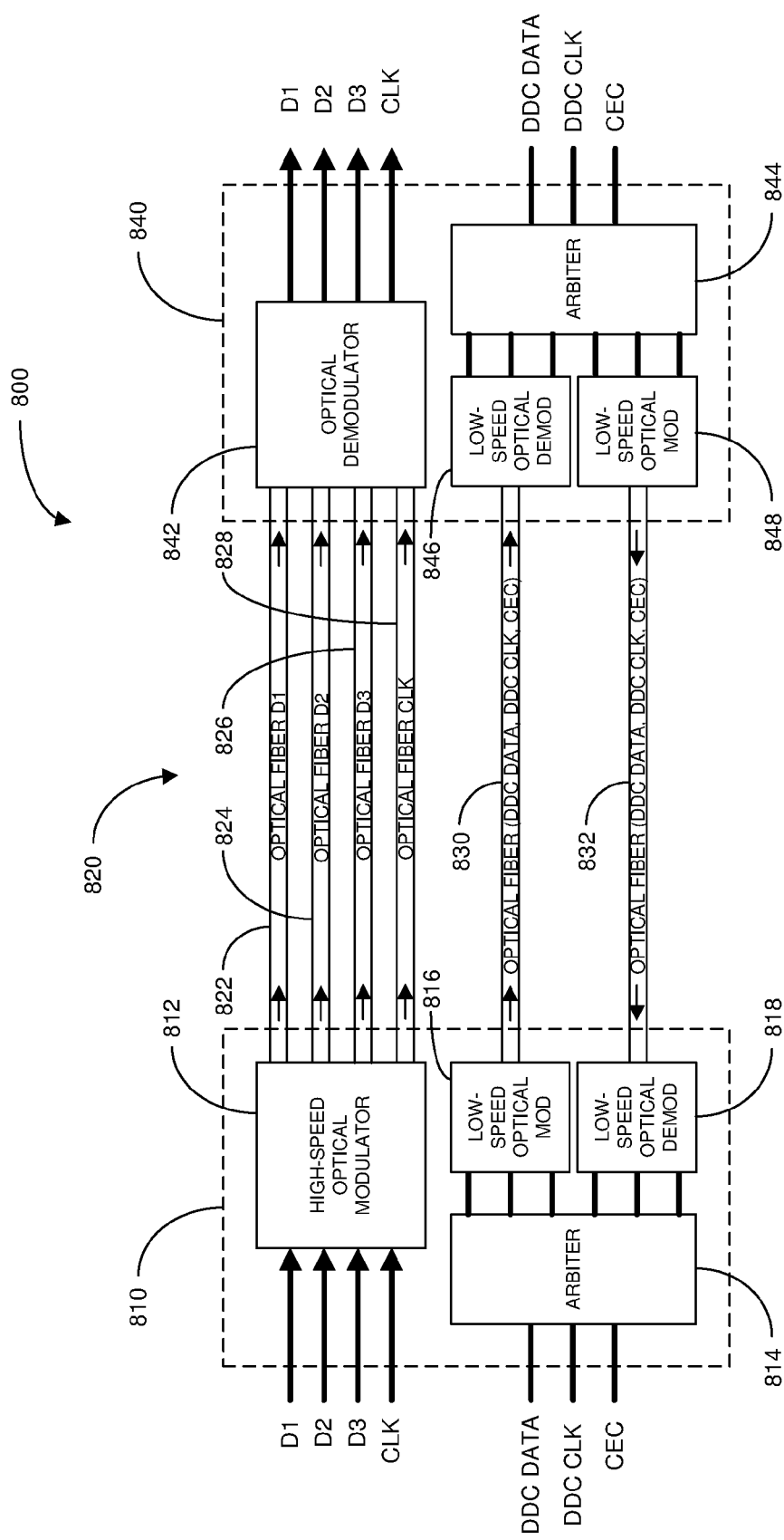
FIG. 8 illustrates a schematic/block diagram of an exemplary data communication cable medium in accordance with an aspect of the disclosure.

FIG. 8 illustrates a schematic/block diagram of an exemplary data communication cable medium 800 in accordance with an aspect of the disclosure. In summary, the data communication cable medium 800 comprises a plurality of optical waveguides (e.g., optical fibers) through which relatively high-speed data (e.g., the TMDS of an HDMI interface) and relatively low-speed data (e.g., DDC and CEC data of an HDMI interface) are communicated. The optical waveguides result in substantially less signal distortion of the high-speed data, thereby allowing the cable medium 800 to achieve much higher lengths without significantly affecting the high-speed signaling.

In particular, with reference to FIG. 8, the data communication cable medium 800 comprises a cable 820, a first connector 810 coupled to an end of the cable 820, and a second connector 840 coupled to an opposite end of the cable 820. The cable 820 comprises a first set of optical waveguides (e.g., optical fibers) 822, 824, 826 and 828 for communicating relatively high-speed data from the first connector 810 to the second connector 840. Additionally, the cable 820 comprises a second set of optical waveguides 830 and 832 for communicating relatively low-speed data between the first connector 810 and the second connector 840. More specifically, the optical waveguide 830 is adapted to communicate relatively low-speed data from the first connector 810 to the second connector 840, and the optical waveguide 832 is adapted to communicate relatively low-speed data from the second connector 840 to the first connector 810.

The first connector 810 is adapted to mate with a corresponding connector of a source of relatively high-speed data, such as a DVD player, Blu-ray player, and others as previously indicated. The first connector 810 comprises a first set of electrical contacts adapted to receive relatively high-speed data, such as the TMDS data (D1-D3 and CLK) of an HDMI interface. The first connector 810 further comprises a second set of electrical contacts adapted to receive and/or produce relatively low-speed data, such as the DDC DATA, DDC CLK, and CEC of an HDMI interface. The first and second sets of electrical contacts of the first connector 810 may be configured substantially the same as a standard HDMI connector.

The first connector 810 further comprises a high-speed optical modulator 812 adapted to modulate the high-speed data received via the first set of electrical contacts onto respective optical carriers for transmission via optical waveguides 822, 824, 826, and 828, respectively. For example, with reference to an HDMI interface, the optical modulator 812 is adapted to modulate the TMDS data (e.g., D1-D3 and CLK) onto respective optical carriers for transmission via optical waveguides 822, 824, 826 and 828, respectively.

The first connector 810 also comprises an arbiter 814, a low-speed optical modulator 816, and a low-speed optical demodulator 818. The arbiter 814 is adapted to arbitrate the transmission and reception of the low-speed data to and from the second set of electrical contacts, so as to prevent collision of the low-speed data being communicated from the first connector 810 to the second connector 840, with the low-speed data being communicated from the second connector 840 to the first connector 810. For example, with reference to an HDMI interface, the arbiter 814 has to arbitrate between transmission and reception of the DDC DATA, DDC CLK and CEC to and from the second set of electrical contacts.

The low-speed optical modulator 816, in turn, is adapted to modulate an optical carrier with the relatively low-speed data received from the arbiter 814 for transmission from the first connector 810 to the second connector 840 by way of optical waveguide 830 of the cable 820. For example, with reference to an HDMI interface, the low-speed optical modulator 816 is adapted to modulate an optical carrier with the DDC DATA, DDC CLK, and CEC to an optical carrier for transmission to the second connector 840 by way of optical waveguide 830 of the cable 820.

Similarly, the low-speed optical demodulator 818 is adapted to demodulate relatively low-speed data from an optical carrier received from the second connector 840 by way of optical waveguide 832 of the cable 820. The low-speed optical demodulator 818 provides the demodulated low-speed data to the arbiter 814. For example, with reference to an HDMI interface, the low-speed optical demodulator 818 is adapted to demodulate DDC DATA, DDC CLK and CEC from an optical carrier received from the second connector 840 by way of the optical waveguide 832 of the cable 830.

The second connector 840 is adapted to mate with a corresponding connector of a sink of the relatively high-speed data, such as a television, projector, computer, and others as previously indicated. The second connector 840 comprises a first set of electrical contacts adapted to produce the relatively high-speed data, such as the TMDS data (D1-D3 and CLK) of an HDMI interface. The second connector 840 further comprises a second set of electrical contacts adapted to receive and/or produce the relatively low-speed data, such as the DDC DATA, DDC CLK, and CEC of an HDMI interface. The first and second sets of electrical contacts of the second connector 840 may be configured substantially the same as a standard HDMI connector.

The second connector 840 further comprises an optical demodulator 842 adapted to demodulate the high-speed data on optical carriers received via optical waveguides 822, 824, 826, and 828 onto corresponding electrical contacts, respectively. For example, with reference to an HDMI interface, the optical demodulator 842 is adapted to demodulate the TMDS data (e.g., D1-D3 and CLK) from the optical waveguides 822, 824, 826 and 828 onto corresponding electrical contacts, respectively.

The second connector 840 also comprises an arbiter 844, a low-speed optical demodulator 846, and a low-speed optical modulator 848. The arbiter 844 is adapted to arbitrate the transmission and reception of the low-speed data to and from the second set of electrical contacts of the second connector 840, so as to prevent collision of the low-speed data being communicated from the first connector 810 to the second connector 840, with the low-speed data being communicated from the second connector 840 to the first connector 810. For example, with reference to an HDMI interface, the arbiter 844 arbitrates between transmission and reception of the DDC DATA, DDC CLK and CEC to and from the second set of electrical contacts of the second connector 840.

The low-speed optical demodulator 846 is adapted to demodulate relatively low-speed data from an optical carrier received from the first connector 810 by way of optical waveguide 830 of the cable 820. The low-speed optical demodulator 846 provides the demodulated low-speed data to the arbiter 844. For example, with reference to an HDMI interface, the low-speed optical demodulator 846 is adapted to demodulate DDC DATA, DDC CLK and CEC from an optical carrier received from the first connector 810 by way of the optical waveguide 830 of the cable 820.

Similarly, the low-speed optical modulator 848, in turn, is adapted to modulate an optical carrier with the relatively low-speed data received from the arbiter 844 for transmission from the second connector 840 to the first connector 810 by way of optical waveguide 832 of the cable 820. For example, with reference to an HDMI interface, the low-speed optical modulator 848 is adapted to modulate an optical carrier with the DDC DATA, DDC CLK, and CEC for transmission to the first connector 810 by way of optical waveguide 832 of the cable 820.

Although an HDMI interface is used to exemplify the configuration of the data communication cable medium 800, it shall be understood that the cable medium 800 may be adapted to transmit high- and low-speed data of other protocols using the of optical waveguides. Further, although the high-speed optical modulator 812, arbiter 814, low-speed optical modulator 816 and low-speed optical demodulator 818 have been described as being incorporated into the first connector 810, it shall be understood that these components may be housed separately from the first connector, such as in a separate housing situated between the first connector 810 and the cable 820. Similarly, although the high-speed optical demodulator 842, arbiter 844, low-speed optical demodulator 846, and low-speed optical modulator 848 have been described as being incorporated into the second connector 840, it shall be understood that these components may be housed separately from the second connector, such as in a separate housing situated between the cable 820 and the second connector 840.

Figure 9:
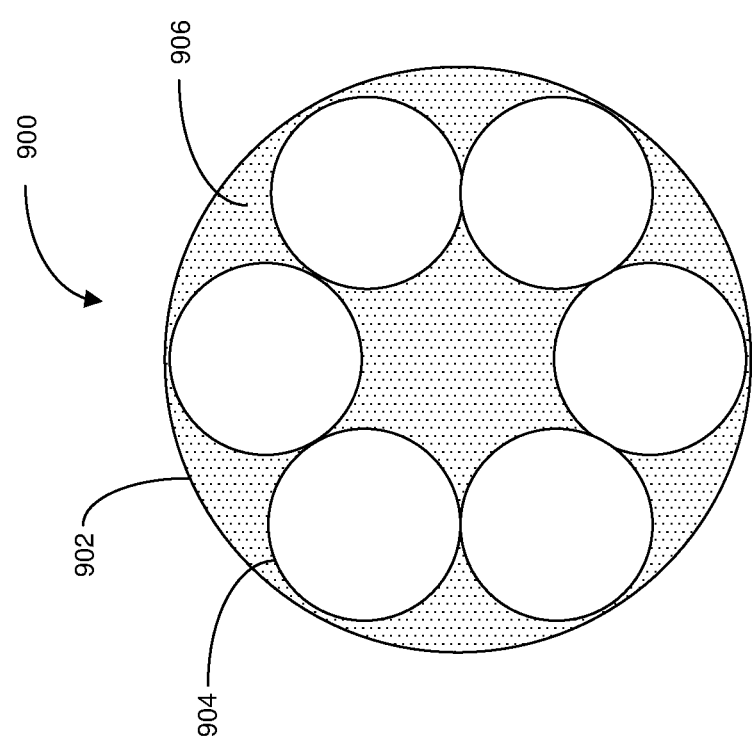
FIG. 9 illustrates a cross-sectional view of an exemplary cable in accordance with another aspect of the disclosure.

FIG. 9 illustrates a cross-sectional view of an exemplary cable 900 in accordance with another aspect of the disclosure. The cable 900 may be one example of an implementation of the cable 820 previously discussed. In particular, the cable 900 comprises a housing or enclosure 902. As typical of cables, the housing or enclosure 902 may be comprised of bendable material to facilitate the routing of the cable 900 along curved paths. The cable 900 further comprises a plurality of optical waveguides 904 (e.g., optical fibers) for communicating the relatively high-speed and relatively low-speed data, as previously discussed. The cable 900 may further provide filler material 906 in order to prevent substantial movement of the optical waveguides 904 within the housing 902 of the cable 900. It shall be understood that the cable 900 may be configured differently to effectuate the routing of the optical waveguides, as previously discussed.

Figure 10:
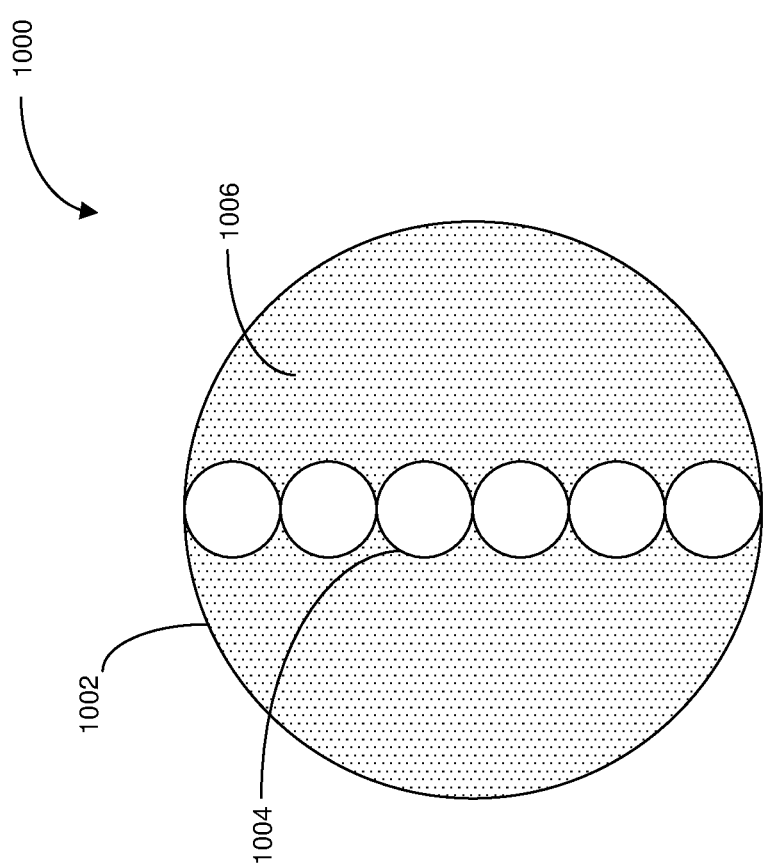
FIG. 10 illustrates a cross-sectional view of another exemplary cable in accordance with another aspect of the disclosure.

FIG. 10 illustrates a cross-sectional view of another exemplary cable 1000 in accordance with another aspect of the disclosure. The cable 1000 may be one example of an implementation of the cable 820 previously discussed. In particular, the cable 1000 comprises a housing or enclosure 1002. As typical of cables, the housing or enclosure 1002 may be comprised of bendable material to facilitate the routing of the cable 1000 along curved paths. The cable 1000 further comprises a plurality of optical waveguides 1004 (e.g., optical fibers) for communicating the relatively high-speed and relatively low-speed data, as previously discussed. The optical waveguides 1004 may be arranged in a single row array as shown. The cable 1000 may further provide filler material 906 in order to prevent substantial movement of the optical waveguides 1004 within the housing 1002 of the cable 1000. It shall be understood that the cable 1000 may be configured differently to effectuate the routing of the optical waveguides, as previously discussed.

Hybrid Data and Power Communication Cable Medium with Power Indicator

Figure 11:
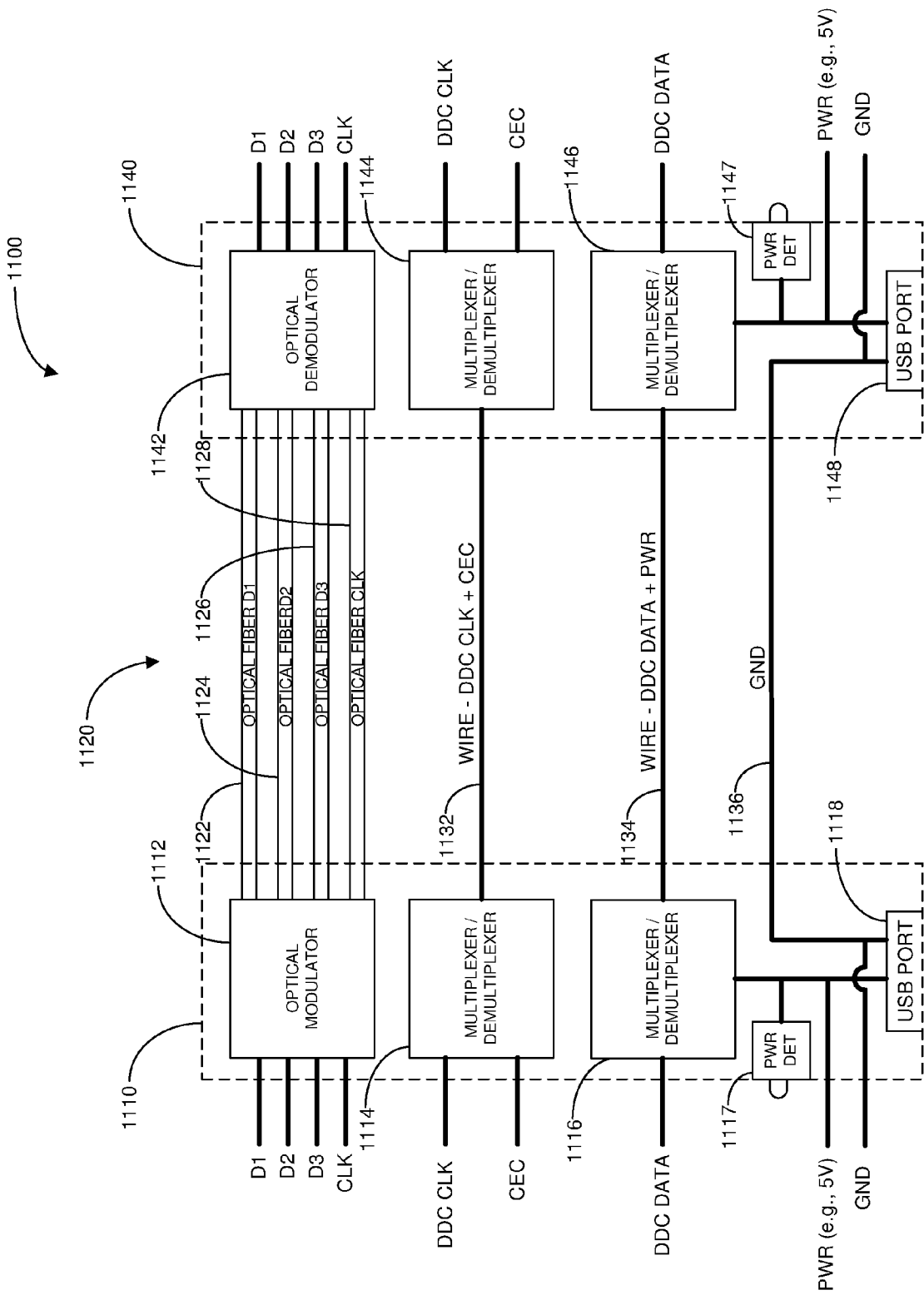
FIG. 11 illustrates a schematic/block diagram of an exemplary data communication cable medium in accordance with an aspect of the disclosure.

FIG. 11 illustrates a schematic/block diagram of an exemplary data communication cable medium 1100 in accordance with an aspect of the disclosure. In summary, the data communication cable medium 1100 comprises a plurality of optical waveguides (e.g., optical fibers) through which relatively high-speed data (e.g., the TMDS data of an HDMI interface) are communicated, and a plurality of electrical wires through which relatively low-speed data (e.g., DDC data and clock, and CEC of an HDMI interface) and power (e.g., 5 Volts and Ground) are communicated. The optical waveguides result in substantially less signal distortion of the high-speed data, thereby allowing the cable medium 1100 to achieve much higher lengths without significantly affecting the high-speed signaling.

Continuing the summary, the data communication cable medium 1100 provisioning for the transmission of power allows one device to provide power to another device by way of the cable medium 1100. Additionally, the cable medium 1100 includes circuitry for providing an indication whether power is available or not. Further, the cable medium 1100 further comprises a port (e.g., a Universal Serial Bus (USB) port) for connection to a third device that provides a source of power for the cable. Such a port may be provided at the respective connectors of the cable medium 1100, as described herein. Accordingly, if neither the V/A source nor V/A sink attached to both connectors of the cable medium 1100 have available power, via the port, power may be supplied by a third device.

In particular, with reference to FIG. 11, the data communication cable medium 1100 comprises a cable 1120, a first connector 1110 coupled to an end of the cable 1120, and a second connector 1140 coupled to an opposite end of the cable 1120. The cable 1120 comprises a plurality of optical waveguides (e.g., optical fibers) 1122, 1124, 1126 and 1128 for communicating relatively high-speed data from the first connector 1110 to the second connector 1140. Additionally, the cable 1120 comprises a plurality of wire mediums 1132, 1134 and 1136 for communicating relatively low-speed data and power between the first connector 1110 and the second connector 1140.

The first connector 1110 is adapted to mate with a corresponding connector of a source of relatively high-speed data, such as a DVD player, Blu-ray player, and others as previously indicated. The first connector 1110 comprises a first set of electrical contacts adapted to receive relatively high-speed data, such as the TMDS data (D1-D3 and CLK) of an HDMI interface. The first connector 1110 further comprises a second set of electrical contacts adapted to receive and/or produce relatively low-speed data, such as the DDC DATA, DDC CLK, and CEC of an HDMI interface. The first and second sets of electrical contacts of the first connector 1110 may be configured substantially the same as a standard HDMI connector. Additionally, the first connector 1110 comprises a third set of electrical contacts adapted to receive or produce power (e.g., 5 Volts) and ground (GND).

The first connector 1110 further comprises an optical modulator 1112 adapted to modulate the high-speed data received via the first set of electrical contacts onto respective optical carriers for transmission via optical waveguides 1122, 1124, 1126, and 1128, respectively. For example, with reference to an HDMI interface, the optical modulator 1112 is adapted to modulate the TMDS data (e.g., D1-D3 and CLK) onto respective optical carriers for transmission via optical waveguides 1122, 1124, 1126 and 1128, respectively. The modulating of the data onto respective optical carriers may be accomplished by directly modulating vertical-cavity surface emitting laser (VCSEL) devices.

The first connector 1110 also comprises a first multiplexer/demultiplexer 1114 adapted to multiplex relatively low-speed data (being communicated from the high-speed data source to the high-speed data sink) onto the wire medium 1132 of the cable 1120. For example, with reference to an HDMI interface, the first multiplexer/demultiplexer 1114 is adapted to multiplex the DDC CLK and CEC onto the wire medium 1132 for transmission to the second connector 1140. Similarly, the first multiplexer/demultiplexer 1114 is adapted to demultiplex relatively low-speed data (being communicated from the high-speed data sink to the high-speed data source) from the wire medium 1132 of the cable 1120 to corresponding electrical contacts of the first connector 1110. For example, with reference to an HDMI interface, the first multiplexer/demultiplexer 1114 is adapted to demultiplex the DDC CLK and CEC from the wire medium 1132 to the corresponding electrical contacts.

The first connector 1110 further comprises a second multiplexer/demultiplexer 1116 adapted to multiplex low-speed data and power (being communicated from the high-speed data source to the high-speed data sink) onto the wire medium 1134 for transmission to the second connector 1140. For example, with reference to an HDMI interface, the second multiplexer/demultiplexer 1116 is adapted to multiplex the DDC DATA and power (e.g., 5 Volts) onto the wire medium 1134. Similarly, the second multiplexer/demultiplexer 1116 is adapted to demultiplex relatively low-speed data and power (being communicated from the high-speed data sink to the high-speed data source) from the wire medium 1134 of the cable 1120 to corresponding electrical contacts of the first connector 1110. For example, with reference to an HDMI interface, the second multiplexer/demultiplexer 1116 is adapted to demultiplex the DDC DATA and power (e.g., 5 Volts) from the wire medium 1134 to the corresponding electrical contacts. It shall be understood that the DDC data and power need not be transmitted in the same direction.

The ground potential, associated with the communicated power, may be coupled directly via a wire medium from the first connector 1110 to the second connector 1140 by way of the cable 1120. For instance, the first connector 1110 may directly couple the ground electrical contact to the wire medium 1136 of the cable 1120. Similarly, the second connector 1140 may directly couple the wire medium 1136 of the cable 1120 to the corresponding ground electrical contact.

The first connector 1110 further comprises a port 1118 (e.g., a USB) adapted to receive a compatible connector (e.g., a USB connector) from a third device. The port 1118 includes an electrical contact coupled to the power electrical contact of the first connector 1110. This electrical contact is adapted to receive power from the third device via the compatible connector. The port 1118 includes an electrical contact coupled to the ground electrical contact of the first connector 1110. This electrical contact is adapted to receive ground potential from the third device via the compatible connector. The first connector 1110 further comprises a power detector 1117 adapted to provide an indication (e.g., turn on an LED) when available power is present or not.

The second connector 1140 is adapted to mate with a corresponding connector of a sink of the relatively high-speed data, such as a television, projector, computer, and others as previously indicated. The second connector 1140 comprises a first set of electrical contacts adapted to produce the relatively high-speed data, such as the TMDS data (D1-D3 and CLK) of an HDMI interface. The second connector 1140 further comprises a second set of electrical contacts adapted to receive and/or produce the relatively low-speed data, such as the DDC DATA, DDC CLK, and CEC of an HDMI interface. The first and second sets of electrical contacts of the second connector 1140 may be configured substantially the same as a standard HDMI connector. Additionally, the second connector 1140 comprises a third set of electrical contacts adapted to receive or produce power (e.g., 5 Volts) and ground (GND).

The second connector 1140 further comprises an optical demodulator 1142 adapted to demodulate the high-speed data on optical carriers received via optical waveguides 1122, 1124, 1126, and 1128 to corresponding electrical contacts, respectively. For example, with reference to an HDMI interface, the optical demodulator 1142 is adapted to demodulate the TMDS data (e.g., D1-D3 and CLK) from the optical waveguides 1122, 1124, 1126 and 1128 to corresponding electrical contacts, respectively. The demodulating of the data from the optical carriers may be accomplished by PIN photodiodes with receiving circuitry (transimpedance amplifier (TIA)).

The second connector 1140 also comprises a first multiplexer/demultiplexer 1144 adapted to multiplex relatively low-speed data (being communicated from the high-speed data sink to the high-speed data source) onto the wire medium 1132 of the cable 1120. For example, with reference to an HDMI interface, the second multiplexer/demultiplexer 1144 is adapted to multiplex the DDC CLK and CEC onto the wire medium 1132. Similarly, the first multiplexer/demultiplexer 1144 is adapted to demultiplex relatively low-speed data (being communicated from the high-speed data source to the high-speed data sink) from the wire medium 1132 of the cable 1120 to corresponding electrical contacts of the second connector 1140. For example, with reference to an HDMI interface, the first multiplexer/demultiplexer 1144 is adapted to demultiplex the DDC CLK and CEC from the wire medium 1132 to the corresponding electrical contacts.

The second connector 1140 further comprises a second multiplexer/demultiplexer 1146 adapted to multiplex low-speed data and power (being communicated from the high-speed data sink to the high-speed data source) onto the wire medium 1134 for transmission to the first connector 1110. For example, with reference to an HDMI interface, the second multiplexer/demultiplexer 1146 is adapted to multiplex the DDC DATA and power (e.g., 5 Volts) onto the wire medium 1134. Similarly, the second multiplexer/demultiplexer 1146 is adapted to demultiplex relatively low-speed data and power (being communicated from the high-speed data source to the high-speed data sink) from the wire medium 1134 of the cable 1120 to corresponding electrical contacts of the second connector 1140. For example, with reference to an HDMI interface, the second multiplexer/demultiplexer 1146 is adapted to demultiplex the DDC DATA and power (e.g., 5 Volts) from the wire medium 1134 to the corresponding electrical contacts. As discussed above, it shall be understood that the DDC data and power need not be transmitted in the same direction.

The second connector 1140 further comprises a port 1148 (e.g., a USB) adapted to receive a compatible connector (e.g., a USB connector) from a third device. The port 1148 includes an electrical contact coupled to the power electrical contact of the second connector 1140. This electrical contact is adapted to receive power from the third device via the compatible connector. The port 1148 includes an electrical contact coupled to the ground electrical contact of the second connector 1140. This electrical contact is adapted to receive ground potential from the third device via the compatible connector. The second connector 1140 further comprises a power detector 1147 adapted to provide an indication (e.g., turn on an LED) when available power is present or not.

Although an HDMI interface is used to exemplify the configuration of the data communication cable medium 1100, it shall be understood that the cable medium 1100 may be adapted to transmit high- and low-speed data and power using the combination of optical waveguides and wires. Further, although the optical modulator 1112 and first and second multiplexer/demultiplexer 1114 and 1116 have been described as being incorporated into the first connector 1110, it shall be understood that these components may be housed separately from the first connector, such as in a separate housing situated between the first connector 1110 and the cable 1120. Similarly, although the optical demodulator 1142 and first and second multiplexer/demultiplexer 1144 and 1146 have been described as being incorporated into the second connector 1140, it shall be understood that these components may be housed separately from the second connector, such as in a separate housing situated between the cable 1120 and the second connector 1140.

Figure 12:
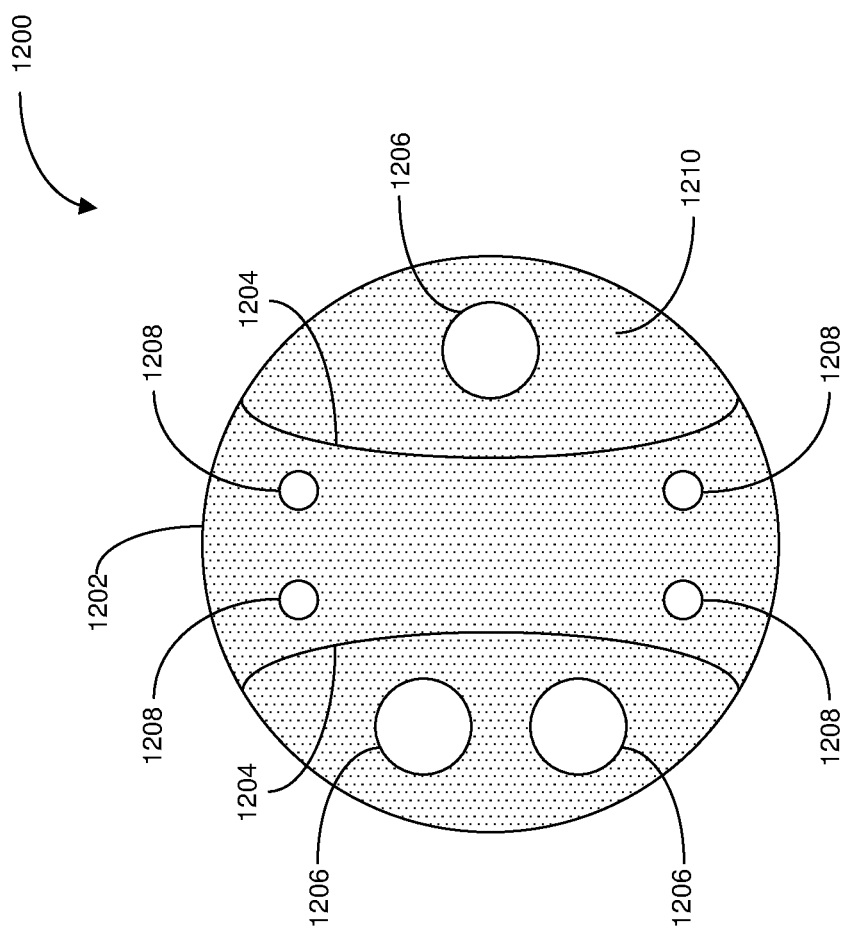
FIG. 12 illustrates a cross-sectional view of an exemplary cable in accordance with another aspect of the disclosure.

FIG. 12 illustrates a cross-sectional view of an exemplary cable 1200 in accordance with another aspect of the disclosure. The cable 1200 may be an example of an implementation of the cable 1120 previously discussed. In particular, the cable 1200 comprises a housing or enclosure 1202. As typical of cables, the housing or enclosure 1202 may be comprised of bendable material to facilitate the routing of the cable 1200 along curved paths. The cable 1202 includes internal walls 1204 to separate the various physical communication mediums disposed therein.

The cable 1200 further comprises a plurality of optical waveguides 1208 (e.g., optical fibers) for communicating the relatively high-speed data, as previously discussed. As shown, the optical waveguides 1208 are situated within a centrally-located compartment within the cable 1200, which is defined by two internal walls 1204 and the housing or enclosure 1202. The cable 1200 further comprises electrical wires 1206 for communicating the relatively low-speed data, power and ground, as previously discussed. A pair of the electrical wires 1206 may be positioned within a leftward-located compartment defined by the left internal wall 1204 and the housing or enclosure 1202. The other electrical wire 1206 may be positioned within a rightward-located compartment defined by the right internal wall 1204 and the housing or enclosure 1202. Filler material 1210 may be provided within the cable 1200 to provide mechanical stability of the communication mediums 1206 and 1208. It shall be understood that the cable 1200 may be configured differently to effectuate the routing of the optical waveguides and electrical wires, as previously discussed.

Figure 13:
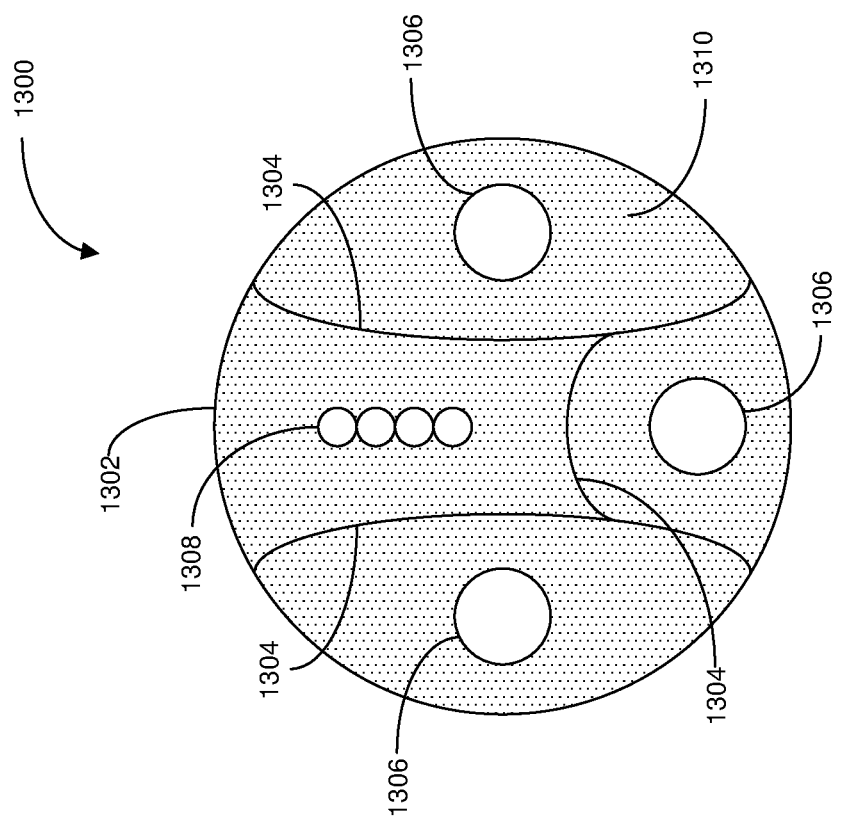
FIG. 13 illustrates a cross-sectional view of another exemplary cable in accordance with another aspect of the disclosure.

FIG. 13 illustrates a cross-sectional view of another exemplary cable 1300 in accordance with another aspect of the disclosure. The cable 1300 may be another example of an implementation of the cable 1120 previously discussed. In particular, the cable 1300 comprises a housing or enclosure 1302. As typical of cables, the housing or enclosure 1302 may be comprised of bendable material to facilitate the routing of the cable 1300 along curved paths. The cable 1302 includes internal walls 1304 to separate the various physical communication mediums disposed therein.

The cable 1300 further comprises a plurality of optical waveguides 1308 (e.g., optical fibers) for communicating the relatively high-speed data, as previously discussed. As shown, the optical waveguides 1308 are arranged in a single row array, and situated within a centrally-located upper compartment within the cable 1300, which is defined by the two internal walls 1304 and the housing or enclosure 1302. The cable 1300 further comprises electrical wires 1306 for communicating the relatively low-speed data, power and ground, as previously discussed. The electrical wires 1306 are positioned within their own compartments defined by a corresponding internal wall 1304 and the housing or enclosure 1302. filler material 1310 may be provided within the cable 1300 to provide mechanical stability of the communication mediums 1306 and 1308. It shall be understood that the cable 1300 may be configured differently to effectuate the routing of the optical waveguides and electrical wires, as previously discussed.

Figure 14:
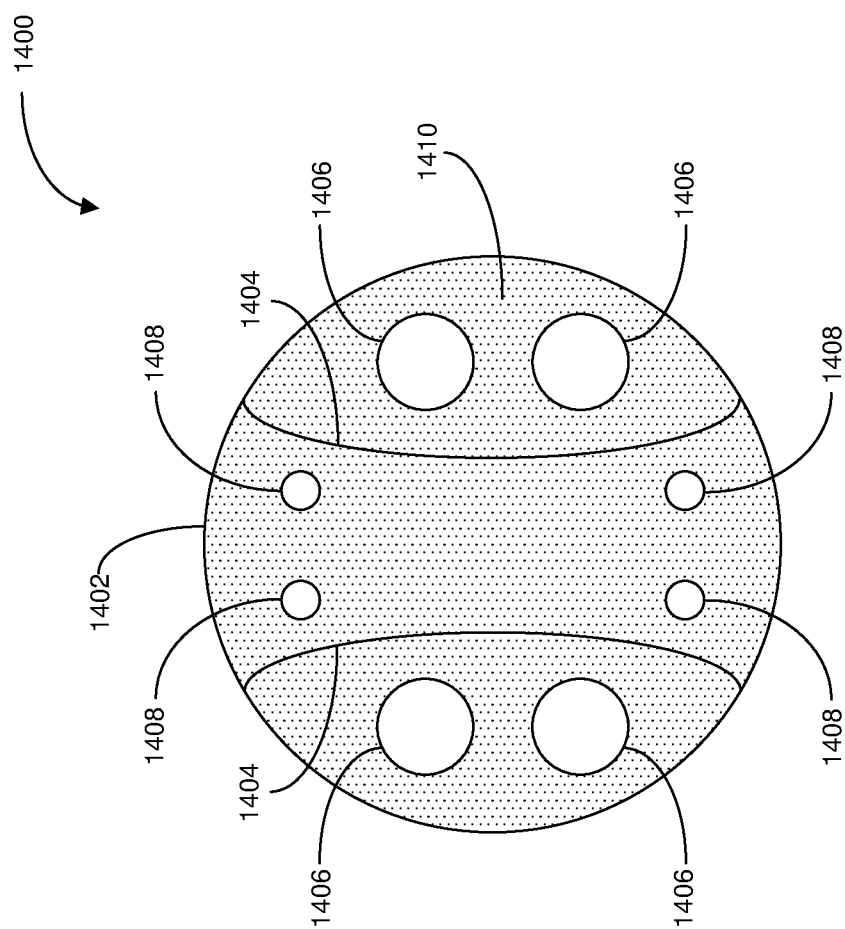
FIG. 14 illustrates a cross-sectional view of yet another exemplary cable in accordance with another aspect of the disclosure.

FIG. 14 illustrates a cross-sectional view of yet another exemplary cable 1400 in accordance with another aspect of the disclosure. The cable 1400 may be another example of an implementation of a modified version of the cable 1120 previously discussed. In particular, the cable 1400 comprises a housing or enclosure 1402. As typical of cables, the housing or enclosure 1402 may be comprised of bendable material to facilitate the routing of the cable 1400 along curved paths. The cable 1402 includes internal walls 1404 to separate the various physical communication mediums disposed therein.

The cable 1400 further comprises a plurality of optical waveguides 1408 (e.g., optical fibers) for communicating the relatively high-speed data, as previously discussed. As shown, the optical waveguides 1408 are situated within a centrally-located compartment within the cable 1400, which is defined by two internal walls 1404 and the housing or enclosure 1402. The cable 1400 further comprises electrical wires 1406 for communicating the relatively low-speed data, power and ground, as previously discussed. A pair of the electrical wires 1406, for communicating the DDC DATA/power and ground, may be positioned within a leftward-located compartment defined by the left internal wall 1404 and the housing or enclosure 1402.

The other pair of the electrical wires 1406, for communicating the DDC CLK and CEC, may be positioned within a rightward-located compartment defined by the left internal wall 1404 and the housing or enclosure 1402. Note that this embodiment may not require the multiplexer/demultiplexer 1116 and 1146, since these two types of information are being communicated with respective wire mediums. Filler material 1410 may be provided within the cable 1400 to provide mechanical stability of the communication mediums 1406 and 1408. It shall be understood that the cable 1400 may be configured differently to effectuate the routing of the optical waveguides and electrical wires, as previously discussed.

Optical Communication Mount

Figure 15:
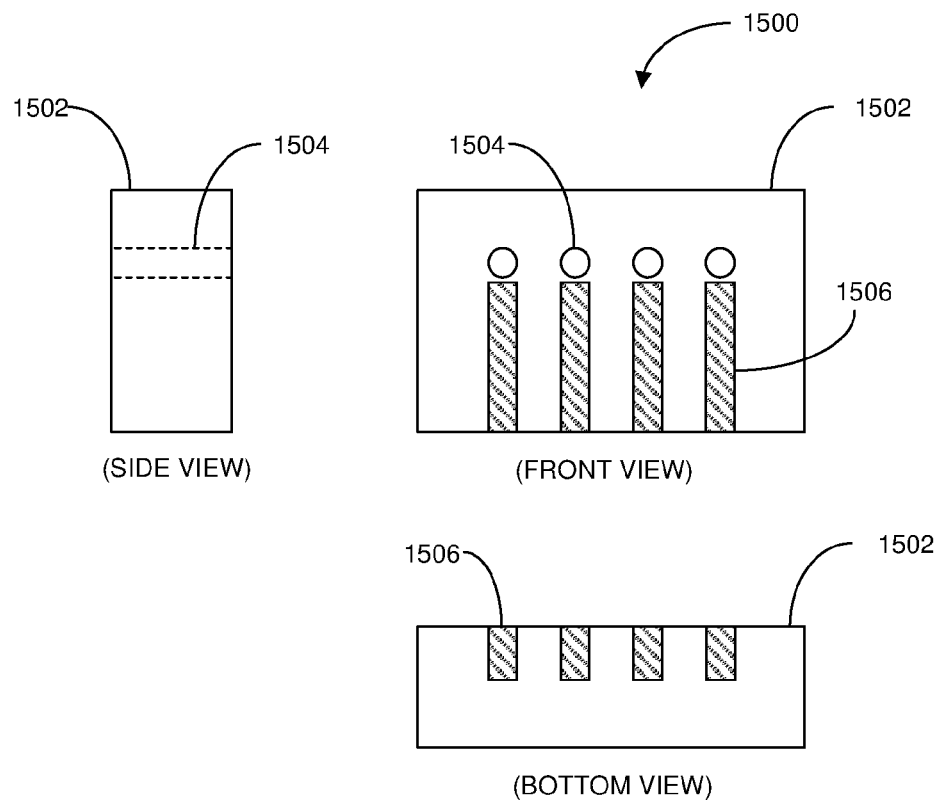
FIG. 15 illustrates side, front and bottom views of an exemplary optical communication mount in accordance with an aspect of the disclosure.

FIG. 15 illustrates side, front and bottom views of an exemplary optical communication mount 1500 in accordance with an aspect of the disclosure. In summary, the mount 1500 comprises a frame or housing that includes one or more thru-holes for receiving, via one side, one or more optical fibers, respectively. One or more corresponding photo detectors (PDs) and/or vertical-cavity surface-emitting lasers (VCSELs) may be positioned proximate the one or more thru-holes on the opposite side of the frame or housing so as to facilitate the reception and/or transmission of optical signals communicated via the one or more optical fibers.

Additionally, the frame or housing includes one or more electrically-conductive traces extending from proximate the one or more thru-holes on a front side of the frame or housing to a bottom side of the frame or housing. The portion of the one or more electrically-conductive traces on the bottom side of the frame or housing are configured to make electrical contact with corresponding one or more electrically-conductive traces on a printed circuit board (PCB) or substrate, respectively. Accordingly, the optical communication mount 100 is configured as a surface-mount device. The one or more electrically-conductive traces facilitate routing one or more bias voltages from a driver circuit mounted on a PCB or substrate to the one or more PDs and/or VCSELs situated proximate the one or more thru-holes of the frame or housing.

More specifically, with reference to FIG. 15, the optical communication mount 1500 comprises a frame or housing 1502 including one or more thru-holes 1504. The frame or housing 1502 may be formed of a substrate, such as a semiconductor or electrical-insulating substrate. Accordingly, the one or more thru-holes 1504 may be configured as one or more via holes formed through the semiconductor or electrical-insulating substrate 1502. The frame or housing 1502 further comprises one or more electrically-conductive traces 1506 extending from proximate the one or more thru-holes 1504 on a front side of the frame or housing, to a bottom side of the frame or housing. The one or more electrically-conductive traces 1506 may be formed of a suitable metallization layer or other electrically-conductive material.

As discussed in more detail herein, the portion of the one or more electrically-conductive traces 1506 on the bottom side of the frame or housing 1502 may be configured to electrically attach to one or more electrically-conductive traces on a PCB or substrate, respectively. Again, this facilitates the surface mounting of the optical communication mount 1500 on a PCB or substrate. Also, as discussed in more detail herein, one or more PDs and/or VCSELs, such as an array of such devices, may be positioned proximate the thru-holes 1504 on the front side, and concentrically aligned with the thru-holes. Accordingly, the one or more electrically-conductive traces 1506 are adapted to route a bias voltage or current to the one or more PDs and/or VCSELs from a driver circuit on a PCB or substrate.

The one or more thru-holes 1504 are adapted to receive one or more optical fibers from the back side of the optical communication mount 1500. Accordingly, in order to efficiently receive and/or transmit signals via the one or more optical fibers, one or more PDs and/or VCSELs are aligned with respect to the one or more thru-holes 1504 in order to substantially maximize the reception and/or transmission of optical signals. The one or more optical fibers may be securely attached to the frame or housing 1502 within the one or more thru-holes 1504 by suitable adhesive and/or friction fit within the thru-holes. As discussed in more detail herein, the one or more thru-holes 1504 may be tapered or stepped in order to better effectuate the friction fit of the one or more optical fibers within the one or more thru-holes 1504, respectively.

Figure 16:
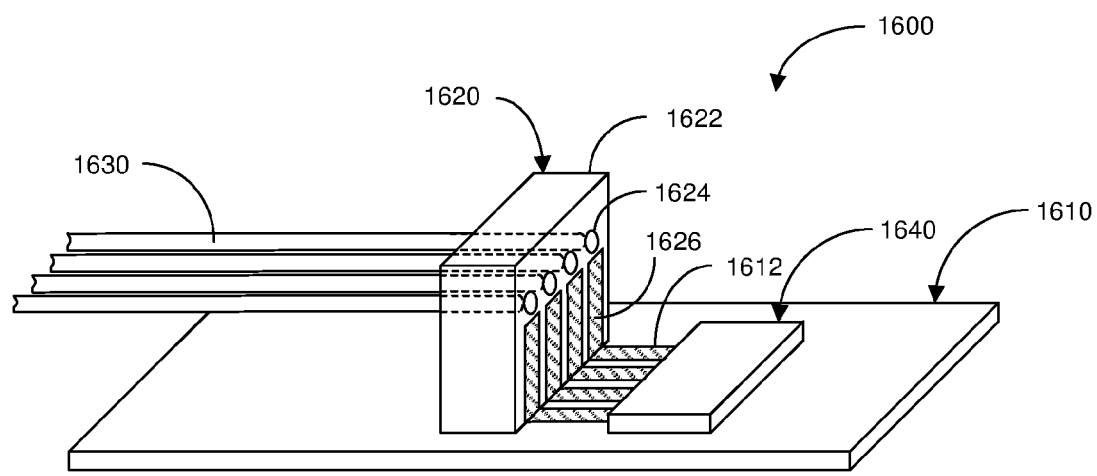
FIG. 16 illustrates a perspective view of an exemplary optical communication system including an optical communication mount securely mounted on a printed circuit board (PCB) or substrate in accordance with another aspect of the disclosure.

FIG. 16 illustrates a perspective view of an optical communication system 1600 including an exemplary optical communication mount 1620 securely disposed on a PCB or substrate 1610 in accordance with another aspect of the disclosure. As in the previous embodiment, the mount 1620 comprises a frame or housing 1622 including a plurality of thru-holes 1624 extending from a front side to a rear side of the frame or housing. Additionally, the mount 1620 further comprises a plurality of electrically-conductive traces 1626 extending proximate the respective thru-holes 1624 on the front side of the frame or housing 1622 to the bottom side of the frame or housing (the portion of the electrically-conductive traces on the bottom side not being illustrated in this figure).

The optical communication mount 1620 is securely attached to the PCB or substrate 1610 in a manner such that the electrically-conductive traces 1626 make electrical contact with corresponding electrically-conductive traces 1612 on the PCB or substrate 1610. For instance, the portion of the electrically-conductive traces 1626 on the bottom side of the frame or housing 1622 may be attached to the corresponding electrically-conductive traces 1612 on the PCB or substrate 1612 using solder, conductive epoxy, or by other techniques. The PCB or substrate 1610 may include thereon a driver circuit 1640 for generating the appropriate bias voltage or current for the PD and/or VCSEL mounted on the optical communication mount 1620, as further discussed herein. For example, the driver circuit 1640 may be a transimpedance (TIA)/limiting amplifier (LA) type of drive circuit. As shown, optical fiber cables 1630 include end portions extending into respective thru-holes 1624 via the rear side of the optical communication mount 1600.

Figure 17A:
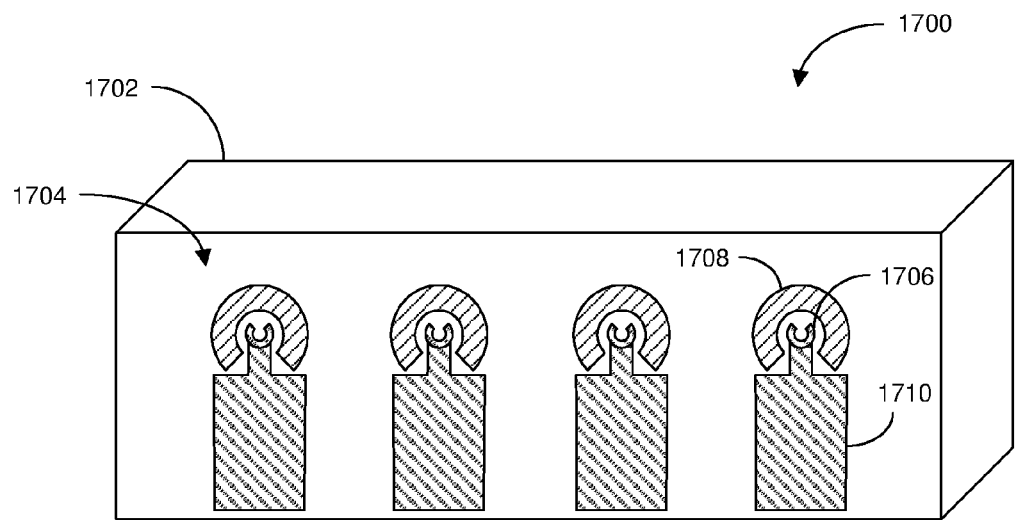
FIG. 17A illustrates a perspective view of a photo detector (PD) or vertical-cavity surface-emitting laser (VCSEL) array in accordance with another aspect of the disclosure.

FIG. 17A illustrates a perspective view of a photo detector (PD) and/or vertical-cavity surface-emitting laser (VCSEL) array device 1700 in accordance with another aspect of the disclosure. The PD and/or VCSEL array device 1700 may be configured to interface with the optical communication mount discussed above. That is, the array device 1700 includes one or more PDs and/or VCSELs arranged so that when the array device is mounted on the optical communication mount discussed above, the one or more PDs and/or VCSELs substantially registers with the one or more thru-holes of the mount.

In particular, the PD and/or VCSEL array 1700 comprises a housing 1702 including an array 1704 of PDs and/or VCSEL devices. For example, all of the devices in the array 1704 may be PDs. In such configuration, the array device 1700 may be configured as a receiver. Alternatively, all of the devices in the array 1704 may be VCSELs. In such configuration, the array device 1700 may be configured as a transmitter. Alternatively, some of the devices in the array 1704 may be VCSELs and other devices in the array may be PDs (e.g., two VCSELs and PDs). In such configuration, the array device 1700 may be configured as a transceiver.

As shown, each device of the array 1704 may comprise an active area 1706, a grounding area 1708, and an electrically-conductive trace 1710 for routing a bias voltage or current to the active area. When the array device 1700 is interfaced with the optical communication mount, the active area 1706 of each device of the array 1704 registers with a thru-hole of the optical communication mount. Additionally, when the array device 1700 is interfaced with the mount, the electrically-conductive trace 1710 makes electrical contact with a corresponding electrically-conductive trace of the mount. As an example, with reference to FIGS. 16 and 17A, a bias voltage or current for a device of the array 1704 may be routed from a driver 1640 to the active area 1706 of the device via an electrically-conductive trace 1612 on the PCB or substrate 1610, an electrically-conductive trace 1626 on the mount 1620, and the electrically-conductive trace 1710 on the array device 1700.

Figure 17B:
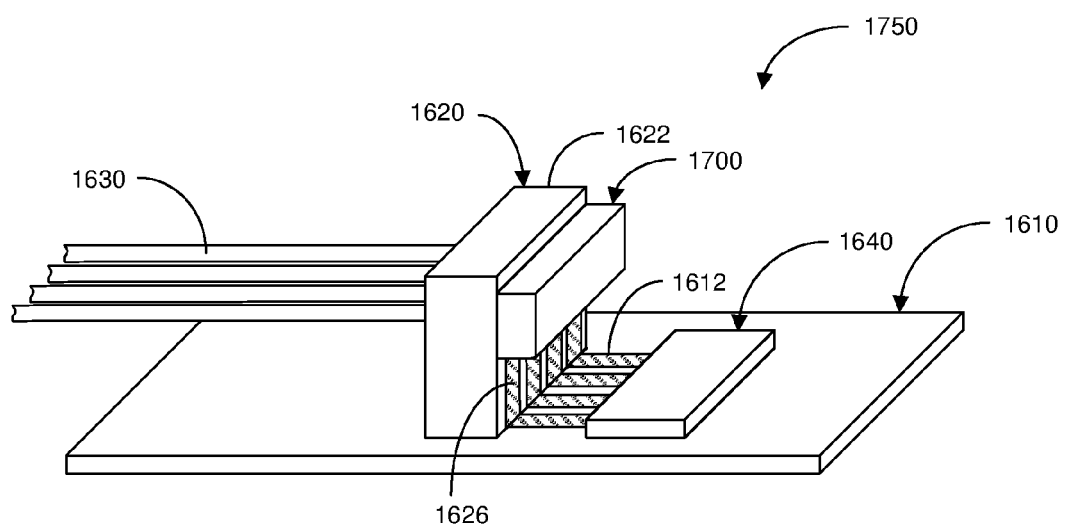
FIG. 17B illustrates a perspective view of an exemplary optical communication system including an optical communication mount with a PD or VCSEL array device mounted thereon, and securely disposed on a PCB or substrate in accordance with another aspect of the disclosure.

FIG. 17B illustrates a perspective view of an optical communication system 1750 comprising the optical communication mount 1620 mounted on the PCB or substrate 1610, and the array device 1700 interfaced with the mount 1620 in accordance with another aspect of the disclosure. In such configuration, the devices of the array 1704 of the device 1700 are substantially aligned with the optical fibers 1630 via the thru-holes in the mount 1620, respectively. Thus, signals communicated via the optical fibers may be processed by the devices of the array. Also, as discussed above, bias voltages for the devices of the array 1704 may be routed from the driver circuit 1640 to the active area 1706 of the devices by way of the electrically-conductive traces 1612 on the PCB or substrate 1610, electrically-conductive traces 1626 on the mount 1620, and the electrically-conductive traces 1710 on the array device 1700.

Figure 18:
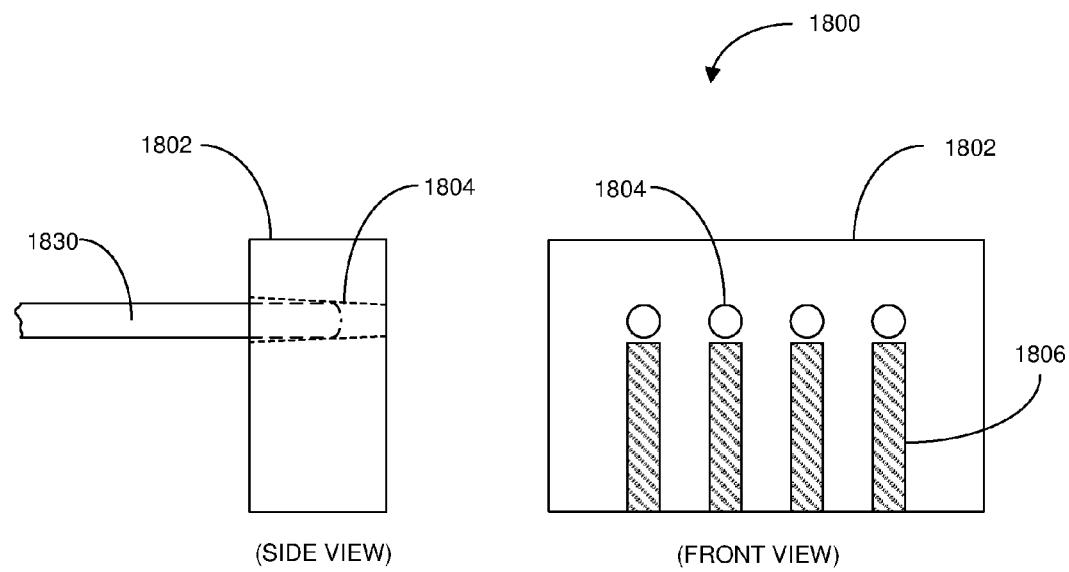
FIG. 18 illustrates side and front views of another exemplary optical communication mount in accordance with another aspect of the disclosure.

FIG. 18 illustrates side and front views of another exemplary optical communication mount 1800 in accordance with another aspect of the disclosure. The mount 1800 is similar to those of the previous embodiments. However, the mount 1800 comprises thru-holes 1804 that are tapered from a rear-side to a front-side of a frame or housing 1802. The tapering of the thru-holes 1804 is such that the opening on the rear-side is wider than the opening on the front-side. This facilitates the insertion of an optical fiber 1830 into a thru-hole 1804 by way of the rear-side, and allows for a friction fiction fit of the optical fiber 1830 within the thru-hole 1804 when the end of the optical fiber is lodged within the hole. As in the previous embodiments, the mount 1800 includes electrically-conductive traces 1806 for routing bias voltage or current to the corresponding devices.

Figure 19:
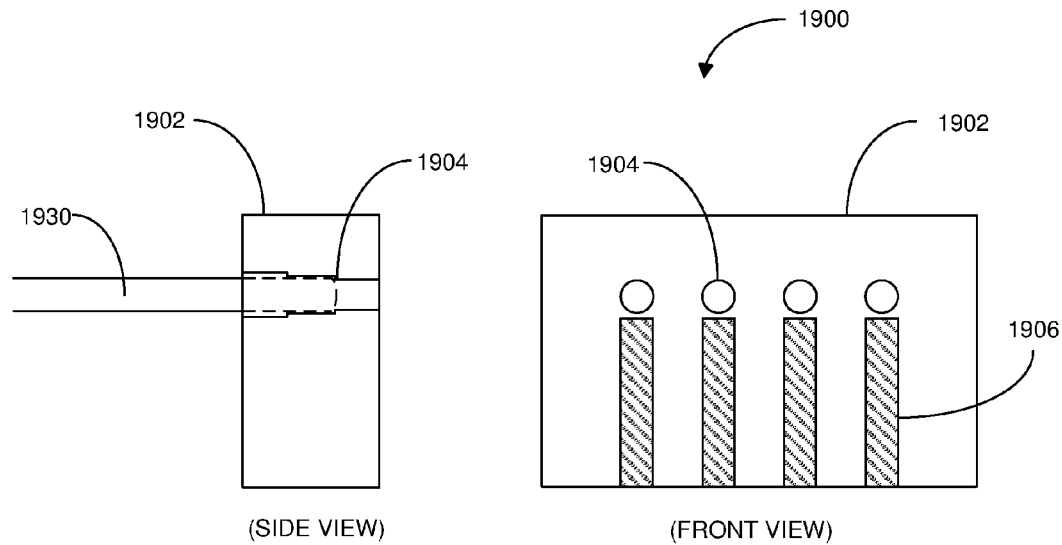
FIG. 19 illustrates side and front views of yet another exemplary optical communication mount in accordance with another aspect of the disclosure.

FIG. 19 illustrates side and front views of yet another exemplary optical communication mount 1900 in accordance with another aspect of the disclosure. The mount 1900 is similar to those of the previous embodiments. However, the mount 1900 comprises thru-holes 1904 that are stepped from a rear-side to a front-side of a frame or housing 1902. The stepping of the thru-holes 1904 is such that the opening on the rear-side is wider than the opening on the front-side. This facilitates the insertion of an optical fiber 1930 into a thru-hole 1904 by way of the rear-side, and allows for a friction fiction fit of the optical fiber 1930 within the thru-hole 1904 when the end of the optical fiber is lodged within the hole. As in the previous embodiments, the mount 1900 includes electrically-conductive traces 1906 for routing bias voltage or current to the corresponding devices.

FIG. 20 illustrates front and bottom views of still another exemplary optical communication mount 2000 in accordance with another aspect of the disclosure. The mount 2000 is similar to those of the previous embodiments. However, the mount 2000 comprises an additional electrically-conductive trace 2008 disposed on front and bottom sides of a frame or housing 2002 of the optical communication mount 2000. This electrically-conductive trace 2008 provides ground potential to the PDs and/or VCSELs that are positioned proximate the holes 2004 formed through the frame or housing 2002, as previously discussed. Thus, in such configuration, electrically-conductive traces 2006 and 2008 are configured to route bias voltage and ground potential to such devices from a PCB or substrate on which the optical communication mount is securely attached.

FIG. 21 illustrates front and bottom views of an additional exemplary optical communication mount 2100 in accordance with another aspect of the disclosure. The mount 2100 is similar to those of the previous embodiments. However, the mount 2100 comprises a frame or housing 2102 that includes a raised boundary region 2108 extending vertically along the front side and horizontally along the top of the frame or housing. The raised boundary region 2108 defines an internal recessed region 2110, which is adapted to receive a PD and/or VCSEL array device, as previously discussed.

When positioned within the recess 2110, the sides of the PD and/or VCSEL array device may be flushed with the top and side portions of the raised boundary region 2108. In this position, the individual devices of the array device may be substantially aligned with the thru-holes 2104 for efficient reception and/or transmission of signals propagating via the optical fibers positioned within the holes. Also, in this position, the electrically-conductive traces on the array device may make electrical contact to the electrically-conductive traces 2106 on the front side of the mount 2100 in order to provide bias voltage from the mount to the array device.

Figure 22:
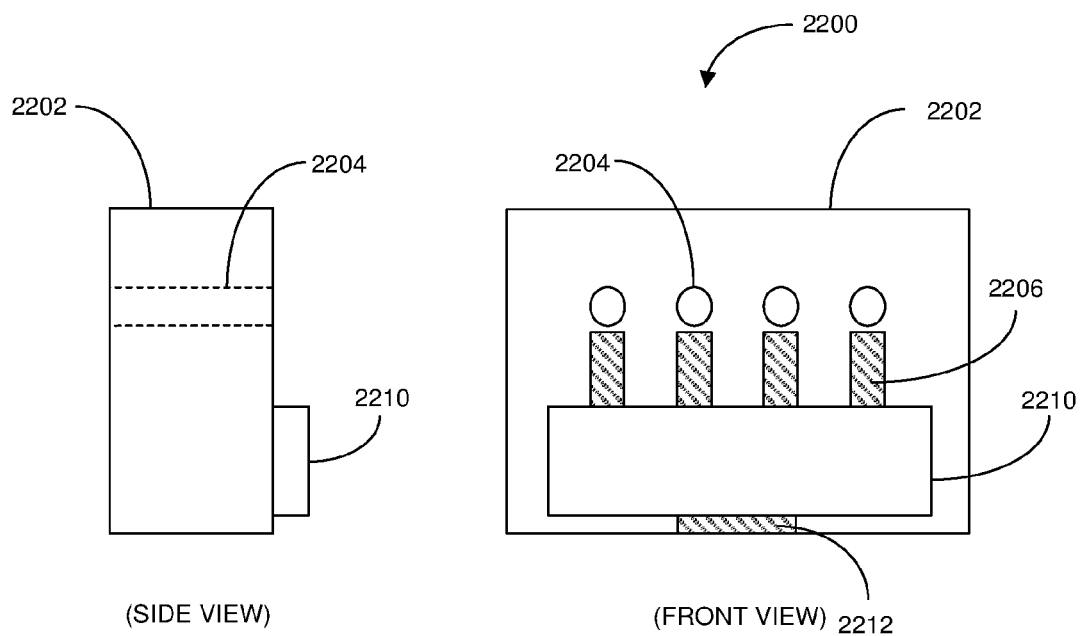
FIG. 22 illustrates side and bottom views of a further exemplary optical communication mount in accordance with another aspect of the disclosure.

FIG. 22 illustrates side and bottom views of a further exemplary optical communication mount 2200 in accordance with another aspect of the disclosure. The mount 2200 is similar to those of the previous embodiments. However, the mount 2200 comprises a frame or housing 2202 that includes thereon a driver circuit 2210 (e.g., TIA/LA) for generating the appropriate bias voltage for devices of an array device that interfaces with the mount. In this regards, the mount 2202 comprises an electrically-conductive trace 2212 disposed on the front side and bottom side (not shown) of the frame or housing 2202. The electrically-conductive trace 2212 provides a source voltage or current to the driver circuit 2210. The driver circuit 2210, in turn, generates appropriate bias voltages for the devices of the array device from the source voltage or current, and provides the bias voltage or current to the devices by way of electrically-conductive traces 2206 disposed on the front side of the frame or housing 2206. When the array device is interfaced with the mount 2200, the devices of the array, substantially aligned with the thru-holes 2204, receive the bias voltage or current from the integrated driver circuit 2210.

Figure 23A:
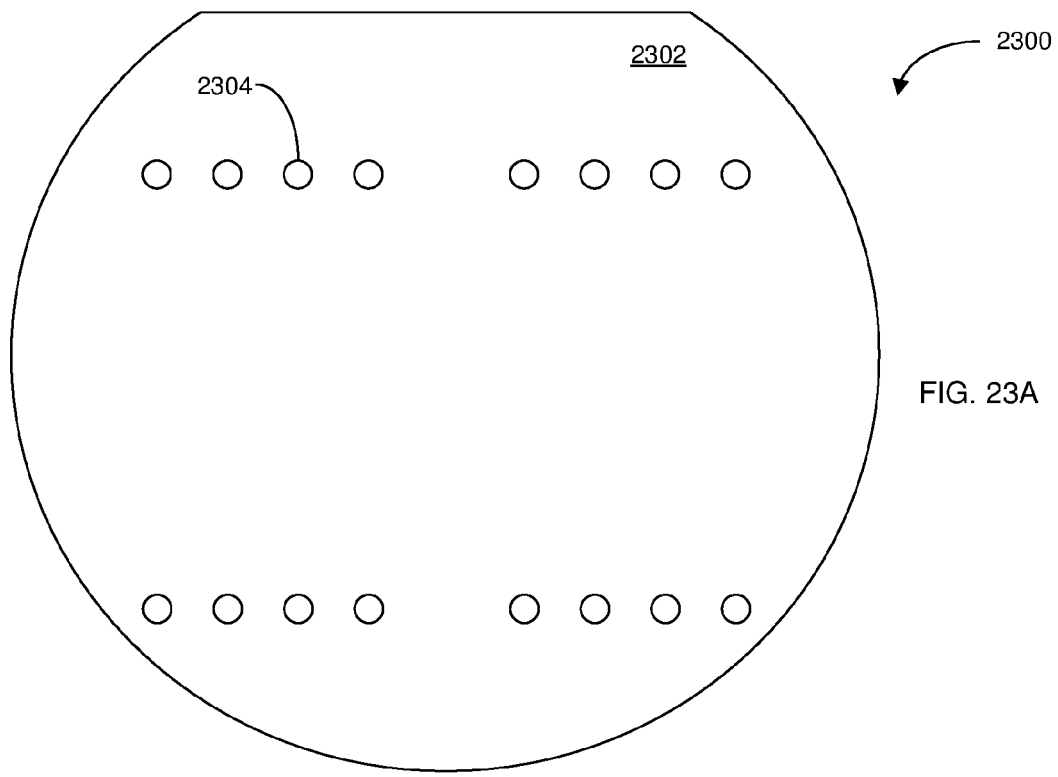
FIG. 23A-23D illustrate top views of an exemplary wafer at various stages of an exemplary method of manufacturing an optical communication mount in accordance with another aspect of the disclosure.

FIG. 23A illustrates a top view of an exemplary wafer 2302 at a relatively early stage of an exemplary method 2300 of manufacturing an optical communication mount in accordance with another aspect of the disclosure. As previously mentioned, the wafer 2302 may be made out of a semiconductor or electrically-insulating material, such as silicon, aluminum nitride (AlN), etc. According to the method 2300, a plurality of via holes 2304 are formed through the wafer 2302. In this example, four (4) mounts are to be formed, each having four (4) holes to configure each of them as a four-channel mount. As discussed above, it shall be understood that the mount may be formed with any number of channels, and a single wafer may include thousands of mounts. In this example, the via holes 2304 are positioned such that pair of mounts are situated bottom-to-bottom with respect to the other pair of mounts.

Figure 23B:
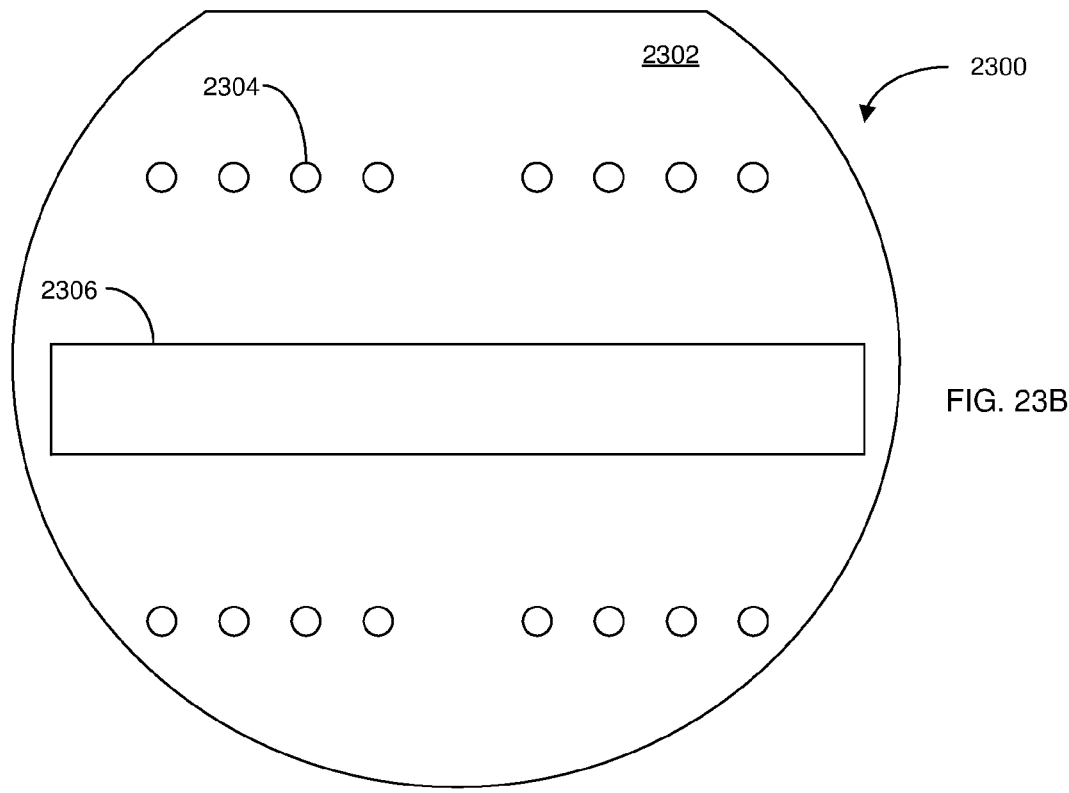

FIG. 23B illustrates a top view of the exemplary wafer 2302 at a subsequent stage of the exemplary method 2300 of manufacturing an optical communication mount in accordance with another aspect of the disclosure. According to the method 2300, a trench 2306 is formed along the common bottom regions of the opposed pair of mounts. The trench 2306 is used to form the electrically-conductive traces on the bottom of the mounts.

Figure 23C:
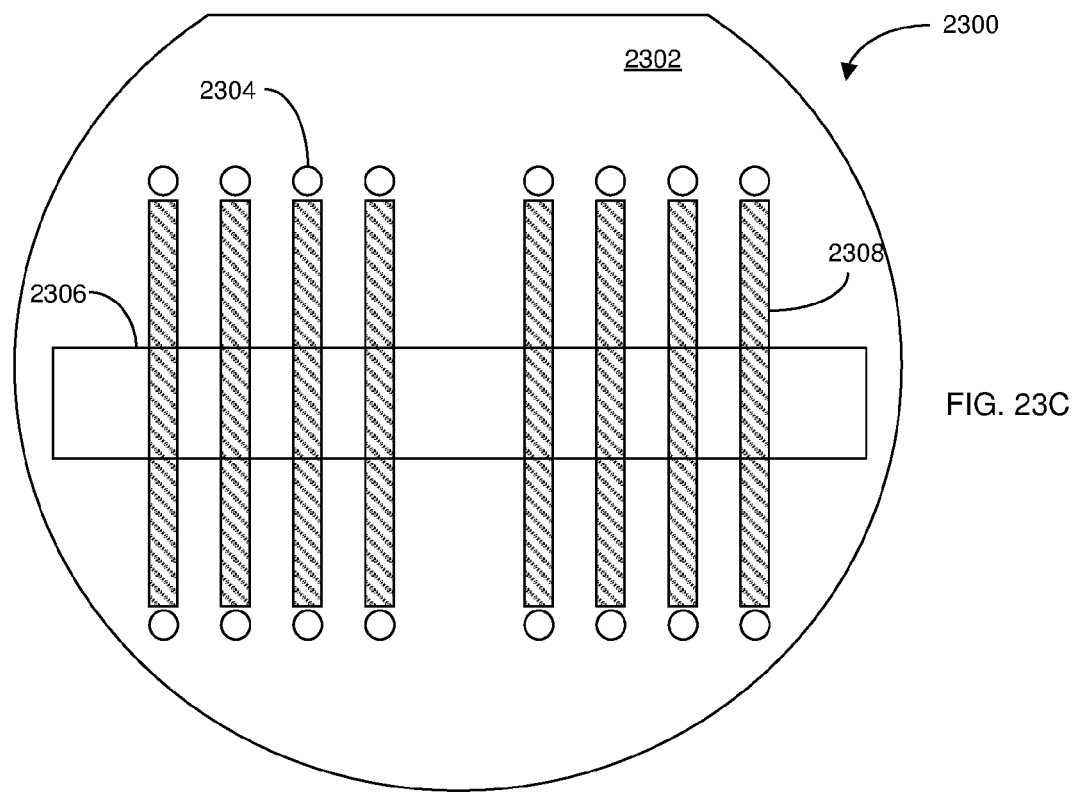

FIG. 23C illustrates a top view of the exemplary wafer 2302 at a subsequent stage of the exemplary method 2300 of manufacturing an optical communication mount in accordance with another aspect of the disclosure. According to the method 2300, electrically-conductive traces 2308 are formed that extend from proximate the via-holes associated with one of the mount pairs to proximate the via holes associated with the other mount pairs.

Figure 23D:
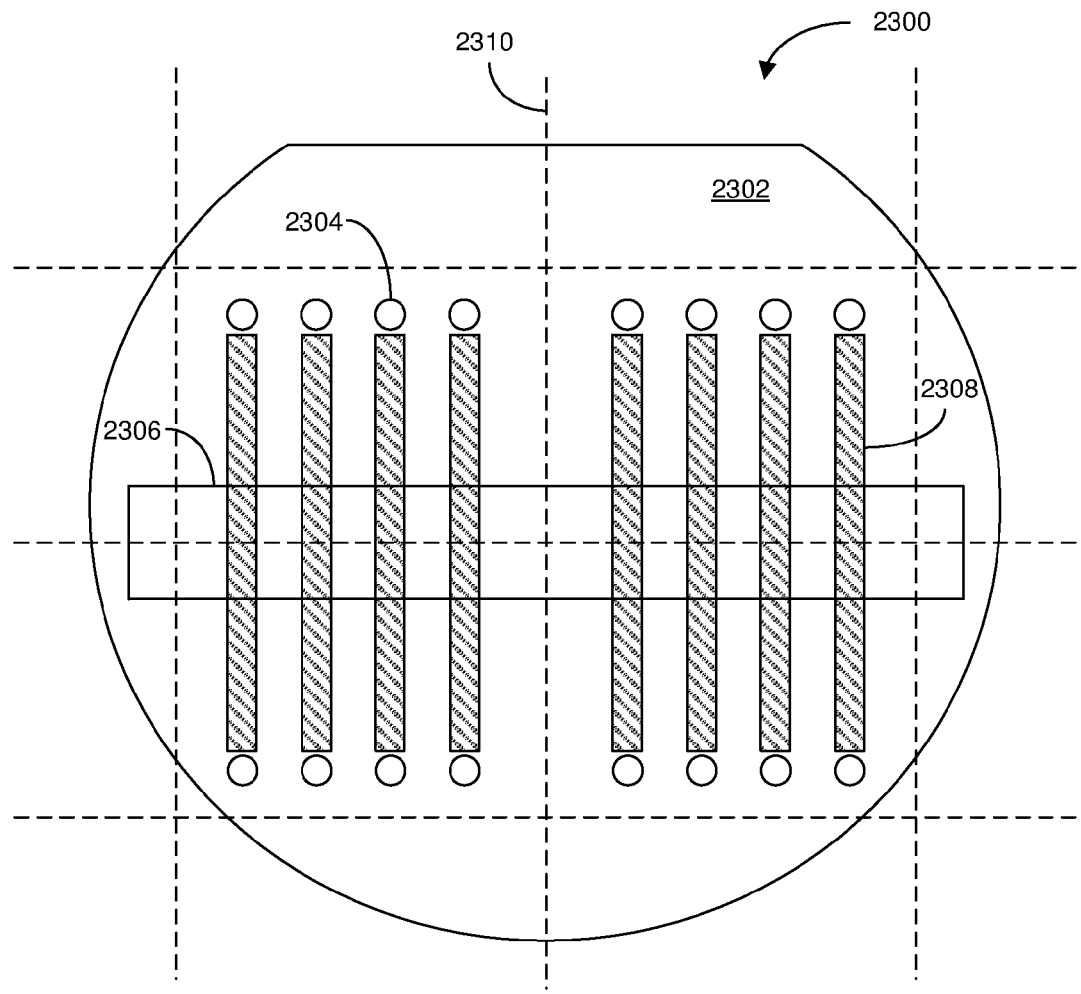

FIG. 23D illustrates a top view of the exemplary wafer 2302 at a subsequent stage of the exemplary method 2300 of manufacturing an optical communication mount in accordance with another aspect of the disclosure. According to the method 2300, after the electrically-conductive traces 2308 are formed, the wafer 2302 to diced along cut-lines 2310 (shown as dashed lines) to form the four (4) individual mounts. It shall be understood that the method 2300 is merely one example of forming an optical communication mount described herein, other methods may be used. Also, although for exemplary purposes, the wafer 2302 is shown only to include four (4) mounts, it shall be understood that the wafer may include thousands of mounts.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A data communications cable, comprising:
   a first connector comprising a first set of one or more electrical contacts configured to receive multimedia data from a first device attached to the first connector;
   an optical modulator configured to modulate one or more optical signals with the multimedia data received from the first device;
   an optical demodulator configured to demodulate the one or more optical signals to regenerate the multimedia data;
   a second connector comprising:
      a second set of one or more electrical contacts configured to provide the regenerated multimedia data to a second device attached to the second connector; and
      a third set of one or more electrical contacts configured to receive control data from the second device;
   one or more optical waveguides for transmitting the one or more modulated optical signals from the first connector to the second connector; and
   a first port configured to receive a first power signal from at least one external device.

2. The data communications cable of claim 1, wherein the first port is coupled to the second connector.

3. The data communications cable of claim 1, wherein the second connector comprises the first port.

4. The data communications cable of claim 1, wherein the first port is coupled to the first connector.

5. The data communications cable of claim 1, wherein the first connector comprises the first port.

6. The data communications cable of claim 1, further comprising one or more wires configured to route the first power signal from the first connector to the second connector.

7. The data communications cable of claim 1, wherein the first port is coupled to the first connector, and further comprising a second port coupled to the second connector, wherein the second port is configured to receive a second power signal from the at least one external device.

8. The data communications cable of claim 1, wherein the first connector comprises the first port, and wherein the second connector comprises a second port configured to receive a second power signal from the at least one external device.

9. The data communications cable of claim 1, wherein the first port comprises a Universal Serial Bus (USB) port.

10. The data communications cable of claim 1, wherein the first connector comprises a fourth set of one or more electrical contacts configured to receive a second power signal from the first device.

11. The data communications cable of claim 10, further comprising one or more wires configured to route the second power signal from the first connector to the second connector.

12. The data communications cable of claim 1, wherein the first connector comprises a fourth set of one or more electrical contacts configured to receive control data from the first device.

13. The data communications cable of claim 12, further comprising one or more wires configured to communicate the control data from the first connector to the second connector.

14. The data communications cable of claim 1, further comprising one or more wires configured to communicate the control data from the second connector to the first connector.

15. The data communications cable of claim 1, wherein the multimedia data is compliant with a High-Definition Multimedia Interface (HDMI) protocol.

16. A data communications cable, comprising:
  a first connector comprising a first set of one or more electrical contacts configured to receive multimedia data from a first device attached to the first connector;
  an optical modulator configured to modulate one or more optical signals with the multimedia data received from the first device;
  an optical demodulator configured to demodulate the one or more optical signals to regenerate the multimedia data;
  a second connector comprising:
    a second set of one or more electrical contacts configured to provide the regenerated multimedia data to a second device attached to the second connector; and
    a third set of one or more electrical contacts configured to receive control data from the second device;
  one or more optical waveguides for transmitting the one or more modulated optical signals from the first connector to the second connector; and
  a USB port configured to receive a power signal from an external device.

17. The data communications cable of claim 16, wherein the USB port is coupled to the second connector.

18. The data communications cable of claim 16, wherein the USB port is coupled to the first connector.

19. The data communications cable of claim 18, further comprising one or more wires configured to route the power signal from the first connector to the second connector.

20. A data communications cable, comprising:
  a first connector comprising a first set of one or more electrical contacts configured to receive multimedia data from a first device attached to the first connector;
  an optical modulator configured to modulate one or more optical signals with the multimedia data received from the first device;
  an optical demodulator configured to demodulate the one or more optical signals to regenerate the multimedia data;
  a second connector comprising:
    a second set of one or more electrical contacts configured to provide the regenerated multimedia data to a second device attached to the second connector; and
    a third set of one or more electrical contacts configured to receive control data from the second device;
  one or more optical waveguides for transmitting the one or more modulated optical signals from the first connector to the second connector;
  a first USB port configured to receive a first power signal from at least one external device, wherein the first USB port is coupled to the first connector; and
  a second USB port configured to receive a second power signal from the at least one external device, wherein the second USB port is coupled to the second connector.

* * * * *